(12) United States Patent
Kobayashi

(10) Patent No.: US 9,766,695 B2
(45) Date of Patent: Sep. 19, 2017

(54) USER INSTRUCTION RECOGNITION SYSTEM AND METHODS

(71) Applicant: NEC Corporation, Tokyo (JP)

(72) Inventor: Yoshikazu Kobayashi, Tokyo (JP)

(73) Assignee: NEC Coproration, Tokyo (JP)

( * ) Notice: Subject to any disclaimer, the term of this patent is extended or adjusted under 35 U.S.C. 154(b) by 60 days.

(21) Appl. No.: 14/433,138

(22) PCT Filed: Sep. 9, 2013

(86) PCT No.: PCT/JP2013/074189
§ 371 (c)(1),
(2) Date: Apr. 2, 2015

(87) PCT Pub. No.: WO2014/054384
PCT Pub. Date: Apr. 10, 2014

(65) Prior Publication Data
US 2015/0277547 A1    Oct. 1, 2015

(30) Foreign Application Priority Data
Oct. 4, 2012  (JP) ................................. 2012-222560

(51) Int. Cl.
*G09G 5/00*    (2006.01)
*G06F 3/01*    (2006.01)
(Continued)

(52) U.S. Cl.
CPC .............. *G06F 3/011* (2013.01); *G06F 3/005* (2013.01); *G06F 3/015* (2013.01); *G06F 3/017* (2013.01);
(Continued)

(58) Field of Classification Search
CPC .......... G06F 3/017; G06F 3/005; G06F 3/011; G06F 3/015; G06F 3/038; G06F 2203/0381
(Continued)

(56) References Cited

U.S. PATENT DOCUMENTS 5,201,034 A *  4/1993  Matsuura ............... G06F 9/4446
                                                    715/204
5,600,765 A *  2/1997  Ando ....................... G06F 3/038
                                                    345/668

(Continued)

FOREIGN PATENT DOCUMENTS

JP    04-372012 A    12/1992
JP    09-244781 A    9/1997
(Continued)

OTHER PUBLICATIONS

International Search Report corresponding to PCT/JP2013/074189, dated Oct. 29, 2013 (3 pages).
(Continued)

*Primary Examiner* — Vijay Shankar
(74) *Attorney, Agent, or Firm* — Wilmer Cutler Pickering Hale and Dorr LLP

(57) ABSTRACT

An apparatus of this invention is directed to an information processing apparatus that continues detection of an instruction of an operator even if the reliability of instruction information detection has lowered due to a device fault, degradation of the environment, and the like. The information processing apparatus includes an instruction history accumulator that accumulates a history of at least two different pieces of instruction information detected from a user and an instruction of the user in association with each other, an instruction information receiver that receives the instruction information, an instruction recognizer that recognizes the instruction of the user from the received instruc-
(Continued)

tion information by referring to the history of the instruction information, a reliability determiner that determines the reliability of the received instruction information by referring to the history of the instruction information, and an instruction information changer that changes the instruction information to be received to another instruction information by referring to the history of the instruction information when the reliability determiner determines that the reliability of the received instruction information has lowered.

14 Claims, 47 Drawing Sheets

(51) Int. Cl.
*G10L 15/22* (2006.01)
*G06F 3/00* (2006.01)
*G06F 3/038* (2013.01)

(52) U.S. Cl.
CPC .............. *G06F 3/038* (2013.01); *G10L 15/22* (2013.01); *G06F 2203/0381* (2013.01); *G10L 2015/223* (2013.01)

(58) Field of Classification Search
USPC .................................. 345/156–160, 173–179
See application file for complete search history.

(56) References Cited

U.S. PATENT DOCUMENTS

| | | | |
|---|---|---|---|
| 5,878,274 A | | 3/1999 | Kono et al. |
| 6,088,669 A | * | 7/2000 | Maes ....................... G10L 17/00 |
| | | | 704/231 |
| 6,092,043 A | * | 7/2000 | Squires .................. G09B 19/04 |
| | | | 704/251 |
| 6,505,155 B1 | | 1/2003 | Vanbuskirk et al. |

FOREIGN PATENT DOCUMENTS

| | | |
|---|---|---|
| JP | 2000-029661 A | 1/2000 |
| JP | 2003-316387 A | 11/2003 |
| JP | 2012-063921 A | 3/2012 |

OTHER PUBLICATIONS

Extended European Search Report issued by the European Patent Office for Application No. 13843903.9 dated May 3, 2016 (9 pages).

* cited by examiner

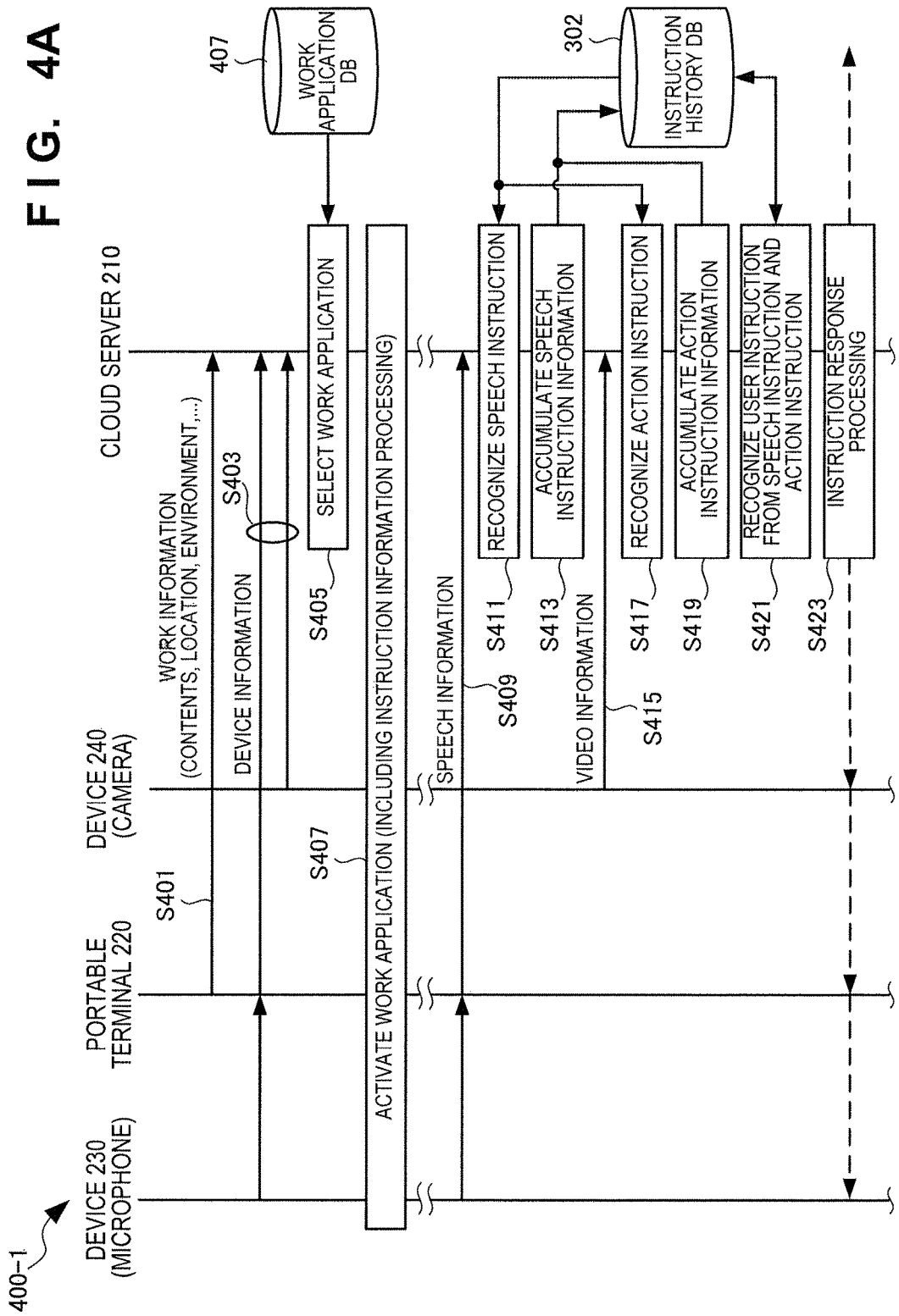

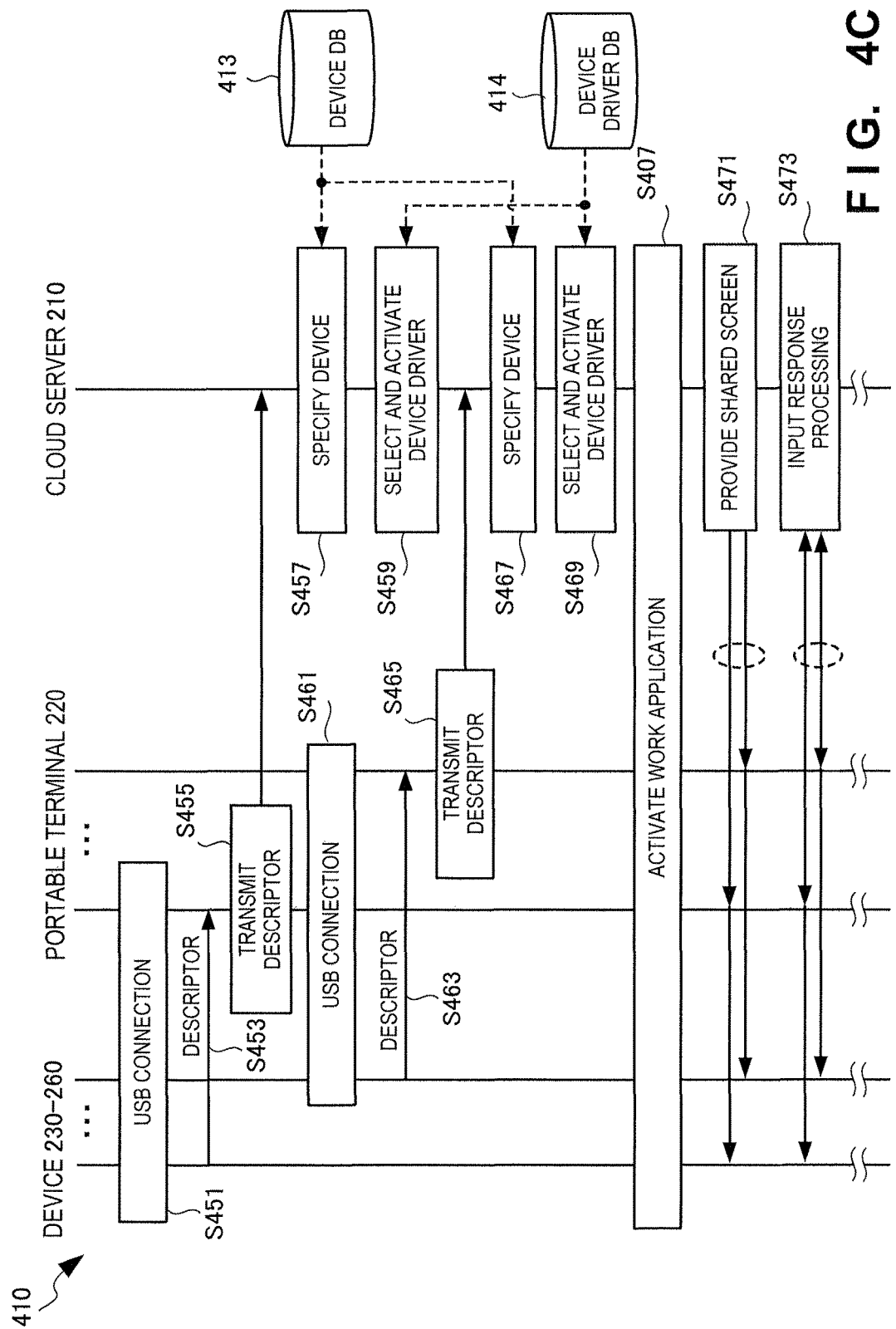

| 711 | 712 | 713 | 714 | 715 | 716 | 717 |
|---|---|---|---|---|---|---|
| USER ID | USER AUTHENTICATION (PASSWORD) | NATIONALITY | LANGUAGE | GROUP ID | ADDRESS | OTHER DATA (AGE/GENDER/HISTORY...) |
| U00001 | abcdefg | JAPAN | JAPANESE | G0001 | METROPOLIS OF TOKYO | 35 YEARS OLD/MALE/... |
| U00002 | hijklmno | CHINA | CHINESE | G0002 | KANAGAWA PREFECTURE | 22 YEARS OLD/FEMALE/... |
| ... | | | | | | |

710

| 721 | 722 | 723 |
|---|---|---|
| GROUP ID | GROUP NAME (LEGAL PERSON NAME) | WORK CONTENTS |
| G0001 | COMPANY A | BUILDING CONSTRUCTION |
| G0002 | COMPANY B | VENUE GUIDE |
| ... | | |

| WORK APPLICATION ID | GROUP ID | WORK CONTENTS | FIRST CONNECTED DEVICE FOR INSTRUCTION | SECOND CONNECTED DEVICE FOR INSTRUCTION | ... |
|---|---|---|---|---|---|
| A00101 | G0001 | BUILDING CONSTRUCTION | MICROPHONE (EARPHONE WITH MICROPHONE) | CONDUCTION SENSOR | |
| A00012 | G0002 | VENUE GUIDE | MICROPHONE | CAMERA | |
| ... | | | | | |

F I G. 8

| | | | INSTRUCTION INFORMATION ACQUISITION DATE/TIME | FIRST CONNECTED DEVICE | | SECOND CONNECTED DEVICE | | ... | RECOGNIZED USER INSTRUCTION | SUCCESS/ FAILURE |
|---|---|---|---|---|---|---|---|---|---|---|
| WORK APPLICATION ID | GROUP ID | USER ID | | ID | INSTRUCTION INFORMATION | ID | INSTRUCTION INFORMATION | | | |
| A00101 | G0001 | U00001 | 2012/09/28 | D0001 | SPEECH | D0101 | MYOELECTRIC CURRENT | | START OF MEASUREMENT | ○ |
| | | | 2012/10/01 | D0001 | SPEECH | D0002 | FINGER ACTION | | END OF MEASUREMENT | × |
| | | | ... | D0001 | SPEECH | | | | | |
| A00012 | G0002 | U00002 | 2012/09/30 | D0001 | SPEECH | D0002 | FINGER ACTION | | START OF MOVEMENT | ○ |
| ... | | | | | | | | | | |

FIG. 9A

| INSTRUCTION INFORMATION OF FIRST CONNECTED DEVICE | INSTRUCTION INFORMATION OF SECOND CONNECTED DEVICE | ... | RECOGNIZED USER INSTRUCTION | SUCCESS COUNT | FAILURE COUNT |
|---|---|---|---|---|---|
| hajime (SPEECH) | INSTRUCTION (CONDUCTION) | | START OF MEASUREMENT | 1,255 | 15 |
| owari (SPEECH) | INSTRUCTION (FINGER ACTION) | | END OF MEASUREMENT | 897 | 562 |
| ido (SPEECH) | INSTRUCTION (FINGER ACTION) | | START OF MOVEMENT | 2,850 | 7 |
| ... | | | | | |

| WORK APPLICATION ID (941) | SEQUENCE OF USER INSTRUCTIONS (942) | COMBINATION OF USER INSTRUCTIONS (943) | USER INSTRUCTION THAT DOES NOT APPEAR (944) | USER INSTRUCTION HAVING HIGH APPEARANCE RATIO (945) | USER INSTRUCTION HAVING LOW APPEARANCE RATIO (946) | ... |
|---|---|---|---|---|---|---|
| A00101 | ACTIVATE - START - END - STOP | START - END - ACTIVATE - STOP | EXPLAIN, MOVE... | START, STOP,... | ACTIVATE,... | |
| A00012 | EXPLAIN - MOVE - EXPLAIN - MOVE | EXPLAIN - MOVE - MOVE - EXPLAIN | ACTIVATE,... | EXPLAIN, MOVE... | ... | |
| ... | | | | | | |

{940}

302

| 1143 → | 1301 | 1302 | ... | 1303 | 1304 | 1305 | 1306 | 1307 |
|---|---|---|---|---|---|---|---|---|
| | INSTRUCTION COMMAND ID RECOGNIZED n TIMES BEFORE | INSTRUCTION COMMAND ID RECOGNIZED (n-1) TIMES BEFORE | ... | INSTRUCTION COMMAND ID RECOGNIZED LAST TIME | INSTRUCTION COMMAND ID OF FIRST CONNECTED DEVICE | INSTRUCTION COMMAND ID OF SECOND CONNECTED DEVICE | RECOGNIZED INSTRUCTION COMMAND ID | INSTRUCTION CONTENTS |
| | C1000 (ACTIVATE) | C1001 (START) | | C1010 (END) | C0011 (STOP) | C1011 (INSTRUCT) | C1011 | STOP |

FIG. 13

| DEVICE ID 1401 | DEVICE TYPE 1402 | ABSENCE OF SIGNAL 1403 | INSTRUCTION INFORMATION DISCRIMINATION DISABLE 1404 | ENVIRONMENT INFORMATION 1405 | ... | RELIABILITY (HIGH/LOW) 1406 |
|---|---|---|---|---|---|---|
| D0001 | MICROPHONE | ○ | ○ | LITTLE NOISE | ... | HIGH |
| D0002 | CAMERA | ○ | × | DARK | ... | LOW |
| ... | | | | | | |

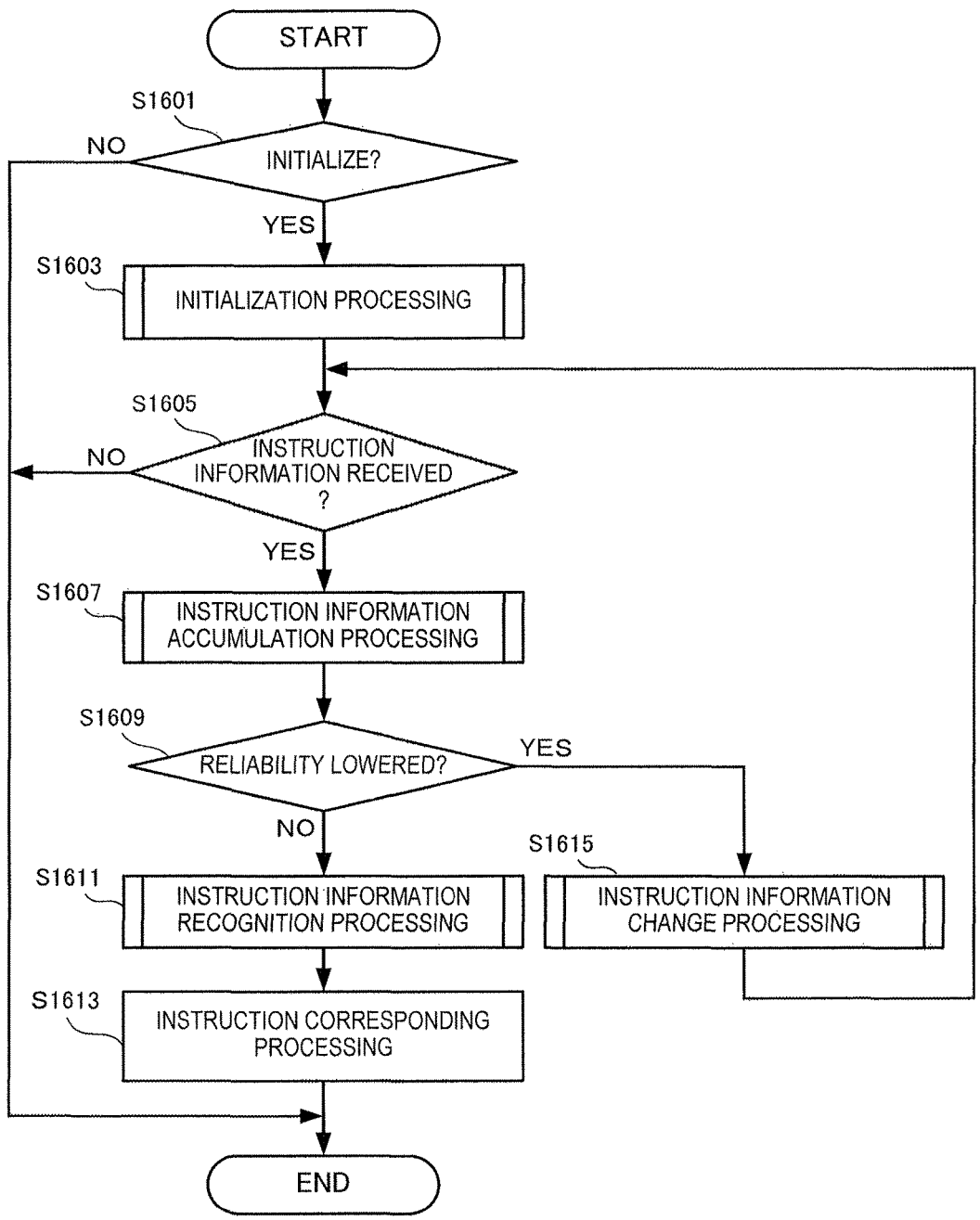
F I G. 16

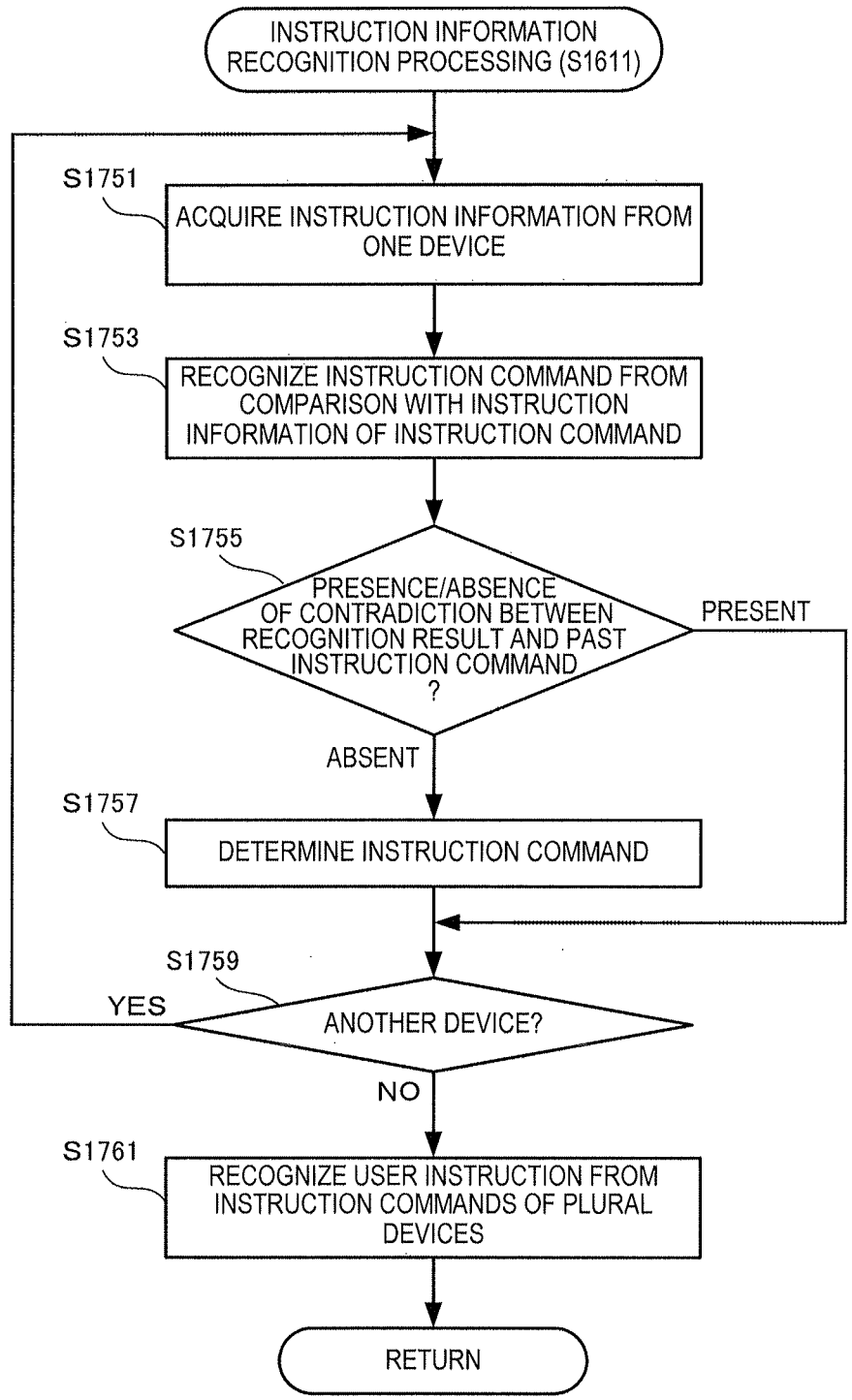
F I G. 17D

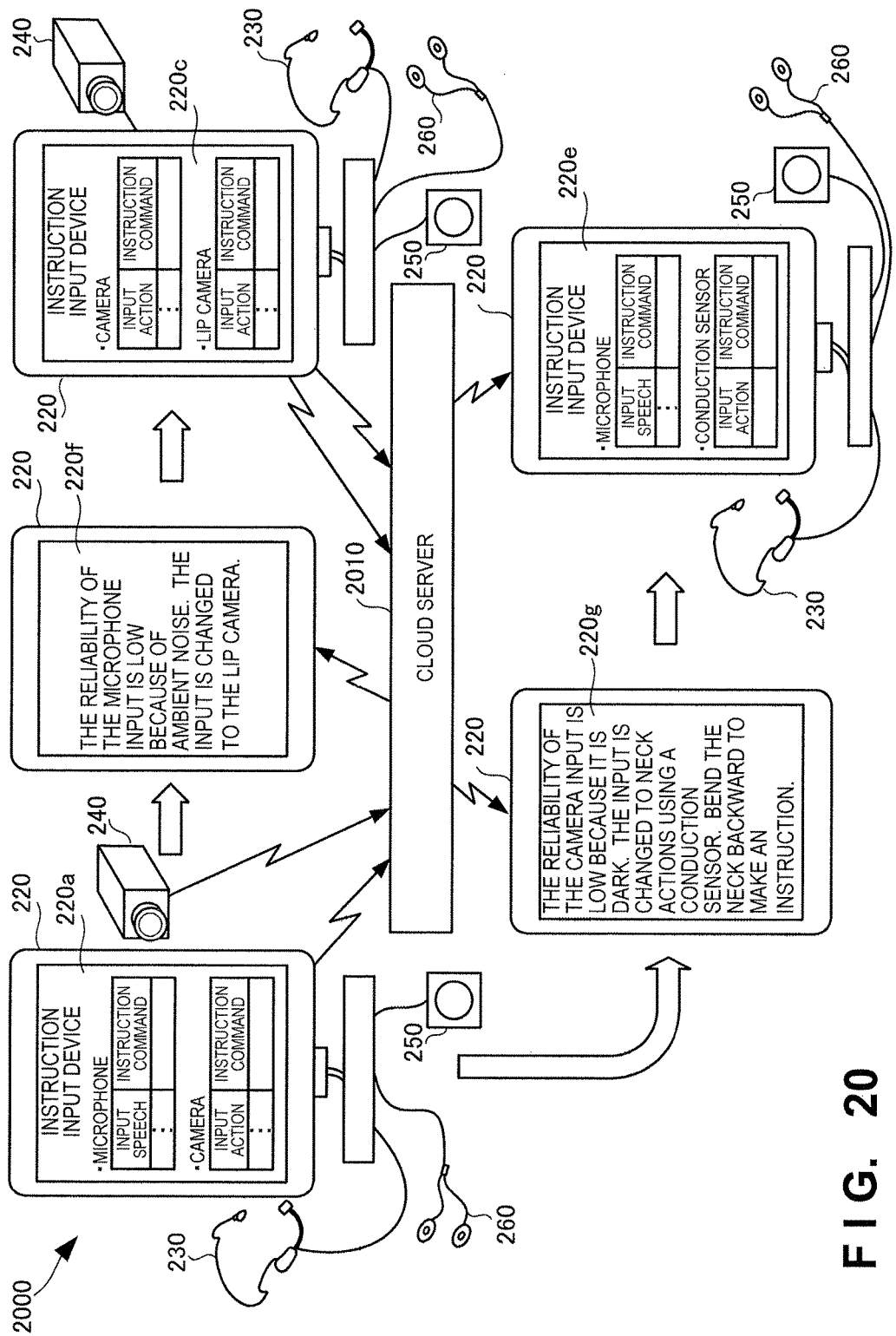
F I G. 20

2602

| WORK APPLICATION ID $\overset{2801}{}$ | CONNECTED DEVICE SET $\overset{2802}{}$ | SUCCESS RATIO $\overset{2803}{}$ |
|---|---|---|
| A00001 | MICROPHONE + CONDUCTION SENSOR | 98% |
|  | ⋮ |  |
| A00002 | MICROPHONE + IMAGE (FINGER ACTION) | 97% |
|  | ⋮ |  |
| ⋮ |  |  |

F I G. 28

| | 2901 | 2902 | 2903 |
|---|---|---|---|
| 2900 | WORK INFORMATION (CONTENTS, LOCATION, DATE/TIME, ENVIRONMENT,...) | WORK APPLICATION ID | SELECTED CONNECTED DEVICE SET |
| | BUILDING CONSTRUCTION, 39TH FLOOR OF BUILDING, OCTOBER 1, P.M., LOW NOISE, SUNSET 17:00 | A00001 | MICROPHONE + CONDUCTION SENSOR |
| | ... | | |

FIG. 29

| WORK APPLICATION ID | INSTRUCTION COMMAND ID | INITIAL SET OF CONNECTED DEVICE/INSTRUCTION INFORMATION | | FIRST ALTERNATIVE SET | | ... | nTH ALTERNATIVE SET | |
|---|---|---|---|---|---|---|---|---|
| | | SUCCESS COUNT | FAILURE COUNT | SUCCESS COUNT | FAILURE COUNT | | SUCCESS COUNT | FAILURE COUNT |
| A00001 | C1001 | 345 | 156 | 1,962 | 6 | | | |
| | C1010 | 825 | 175 | | | | | |
| | ... | | | | | | | |

FIG. 34

USER INSTRUCTION RECOGNITION SYSTEM AND METHODS

CROSS-REFERENCE TO RELATED APPLICATIONS

This application is a national stage application of International Application No. PCT/JP2013/074189 entitled "User Instruction Recognition System, User Instruction Recognition Method, Information Processing Apparatus, Portable Terminal, and Control Methods and Control Programs of Information Processing Apparatus and Portable Terminal," filed on Sep. 9, 2013, which claims the benefit of the priority of Japanese Patent Application No. 2012-222560, filed on Oct. 4, 2012, the disclosures of each of which are hereby incorporated by reference in their entirety.

TECHNICAL FIELD

The present invention relates to a technique of recognizing a user instruction.

BACKGROUND ART

In the above technical field, patent literature 1 discloses a technique of determining an instruction of an operator from an utterance and a nod or a wink. Patent literature 2 discloses a technique of determining an utterance of an operator from an audio signal and a myoelectric signal.

CITATION LIST

Patent Literature

Patent literature 1: Japanese Patent Laid-Open No. 04-372012
Patent literature 2: Japanese Patent Laid-Open No. 2003-316387

SUMMARY OF THE INVENTION

Technical Problem

In the techniques described in the above literatures, however, if the reliability of instruction information detection has lowered due to a device fault, degradation of the environment, and the like, it is impossible to continue detection of the instruction of the operator.

The present invention enables to provide a technique of solving the above-described problem.

Solution to Problem

One aspect of the present invention provides an information processing apparatus comprising:
an instruction history accumulator that accumulates a history of at least two different pieces of instruction information detected from a user and an instruction of the user in association with each other;
an instruction information receiver that receives the instruction information;
an instruction recognizer that recognizes the instruction of the user from the received instruction information by referring to the history of the instruction information;
a reliability determiner that determines a reliability of the received instruction information by referring to the history of the instruction information; and
an instruction information changer that changes the instruction information to be received to another instruction information by referring to the history of the instruction information when the reliability determiner determines that the reliability of the received instruction information has lowered.

Another aspect of the present invention provides a control method of an information processing apparatus, the method comprising:
receiving instruction information;
recognizing an instruction of a user from the received instruction information by referring to a history of at least two different pieces of instruction information detected from the user, which is accumulated in association with the instruction of the user;
determining a reliability of the received instruction information by referring to the history of the instruction information; and
changing the instruction information to be received to another instruction information by referring to the history of the instruction information when it is determined in the determining the reliability that the reliability of the received instruction information has lowered.

Still other aspect of the present invention provides a control program of an information processing apparatus, the program causing a computer to execute:
receiving instruction information;
recognizing an instruction of a user from the received instruction information by referring to a history of at least two different pieces of instruction information detected from the user, which is accumulated in association with the instruction of the user;
determining a reliability of the received instruction information by referring to the history of the instruction information; and
changing the instruction information to be received to another instruction information by referring to the history of the instruction information when it is determined in the determining the reliability that the reliability of the received instruction information has lowered.

Still other aspect of the present invention provides a portable terminal comprising:
a connector that connects a detection device configured to detect an instruction of a user;
an instruction information transmitter that transmits instruction information detected by the detection device connected to the connector to an information processing apparatus that recognizes the instruction of the user;
a change notification receiver that receives, from the information processing apparatus, a notification to change the instruction information to be transmitted, to another instruction information in correspondence with a decrease in a reliability of the transmitted instruction information; and
a connection notifier that notifies the information processing apparatus that a detection device configured to detect the changed other instruction information is connected to the connector.

Still other aspect of the present invention provides a control method of a portable terminal including a connector that connects a detection device configured to detect an instruction of a user, the method comprising:
transmitting instruction information detected by the detection device connected to the connector to an information processing apparatus that recognizes the instruction of the user;
receiving, from the information processing apparatus, a notification to change the instruction information to be transmitted, to another instruction information in correspondence with a decrease in a reliability of the transmitted instruction information; and notifying the information processing apparatus that a detection device configured to detect the changed other instruction information is connected to the connector.

Still other aspect of the present invention provides a control program of a portable terminal including a connector that connects a detection device configured to detect an instruction of a user, the program causing a computer to execute:

transmitting instruction information detected by the detection device connected to the connector to an information processing apparatus that recognizes the instruction of the user;

receiving, from the information processing apparatus, a notification to change the instruction information to be transmitted, to another instruction information in correspondence with a decrease in a reliability of the transmitted instruction information; and notifying the information processing apparatus that a detection device configured to detect the changed other instruction information is connected to the connector.

Still other aspect of the present invention provides a user instruction recognition system comprising:

an instruction history accumulator that accumulates a history of at least two different pieces of instruction information detected from a user and an instruction of the user in association with each other;

at least two detectors that detects the instruction information;

an instruction recognizer that recognizes the instruction of the user from the instruction information detected by the at least two detectors by referring to the history of the instruction information;

a reliability determiner that determines a reliability of the instruction information by referring to the history of the instruction information; and an instruction information changer that changes the instruction information to another instruction information by referring to the history of the instruction information when the reliability determiner determines that the reliability of the instruction information has lowered.

Still other aspect of the present invention provides a user instruction recognition method comprising:

detecting at least two different pieces of instruction information from a user by at least two detectors;

recognizing an instruction of the user from the instruction information detected by the at least two detectors by referring to a history of the at least two different pieces of instruction information detected from the user, which is accumulated in association with the instruction of the user;

determining a reliability of the instruction information by referring to the history of the instruction information; and changing the instruction information to another instruction information by referring to the history of the instruction information when it is determined in the determining the reliability that the reliability of the received instruction information has lowered.

Advantageous Effects of Invention

According to the present invention, it is possible to continue detection of an instruction of an operator even if the reliability of instruction information detection has lowered due to a device fault, degradation of the environment, and the like.

BRIEF DESCRIPTION OF THE DRAWINGS

FIG. 4A is a sequence chart showing the operation procedure of the user instruction recognition system including the cloud server according to the second embodiment of the present invention;

FIG. 4C is a sequence chart showing the control procedure of USB-connected USB devices according to the second embodiment of the present invention;

FIG. 7 is a view showing the arrangement of a user registration DB according to the second embodiment of the present invention;

FIG. 8 is a view showing the arrangement of an application DB according to the second embodiment of the present invention;

FIG. 9A is a view showing the arrangement of an instruction history DB according to the second embodiment of the present invention;

FIG. 9C is a view showing the arrangement of the instruction history DB according to the second embodiment of the present invention;

FIG. 9D is a view showing the arrangement of the instruction history DB according to the second embodiment of the present invention;

FIG. 13 is a view showing the arrangement of an instruction recognition table according to the second embodiment of the present invention;

FIG. 14 is a view showing the arrangement of a reliability determination table according to the second embodiment of the present invention;

FIG. 16 is a flowchart showing the processing procedure of the cloud server according to the second embodiment of the present invention;

FIG. 17D is a flowchart showing the procedure of instruction information recognition processing according to the second embodiment of the present invention;

FIG. 20 is a view showing the outline of a user instruction recognition system including a cloud server according to the third embodiment of the present invention;

FIG. 28 is a view showing the characteristic arrangement of an instruction history DB according to the fourth embodiment of the present invention;

FIG. 29 is a view showing the arrangement of a preparation device determination table according to the fourth embodiment of the present invention;

FIG. 34 is a view showing the arrangement of an instruction information sorting table according to the fifth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that "device" in this specification is a general term for devices that are connected to a communication terminal by a wire or wirelessly to attain a predetermined input/output function, and basically perform data transmission/reception to/from an outside via the communication terminal.

First Embodiment

An information processing apparatus 100 according to the first embodiment of the present invention will be described with reference to FIG. 1. The information processing apparatus 100 is an apparatus that recognizes a user instruction from a plurality of pieces of instruction information representing the user instruction.

Figure 1:
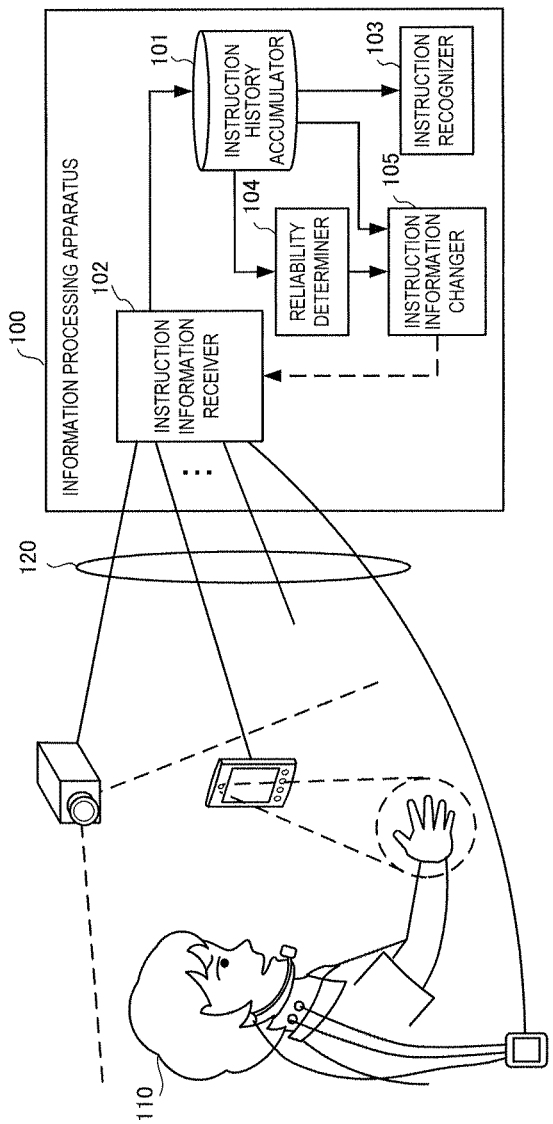
FIG. 1 is a block diagram showing the arrangement of an information processing apparatus according to the first embodiment of the present invention.

As shown in FIG. 1, the information processing apparatus 100 includes an instruction history accumulator 101, an instruction information receiver 102, an instruction recognizer 103, a reliability determiner 104, and an instruction information changer 105. The instruction history accumulator 101 accumulates the history of at least two different pieces of instruction information detected from a user in association with a user instruction. The instruction information receiver 102 receives instruction information. The instruction recognizer 103 refers to the history of instruction information and recognizes a user instruction from received instruction information. The reliability determiner 104 refers to the history of instruction information and determines the reliability of received instruction information. When the reliability determiner 104 determines that the reliability of received instruction information has lowered, the instruction information changer 105 refers to the history of instruction information and changes instruction information to be received to another instruction information.

According to this embodiment, instruction information whose reliability has lowered is changed to another instruction information by referring to the history of instruction information. It is therefore possible to continue detection of an instruction of the operator even if the reliability of instruction information detection has lowered due to a device fault, degradation of the environment, and the like.

Second Embodiment

A user instruction recognition system including an information processing apparatus according to the second embodiment of the present invention will be described next. Note that in this embodiment, a description will be made using a cloud server as an example of a server that is an information processing apparatus. In this embodiment, the reliability of instruction information from a device is determined by referring to an instruction history. If the reliability has lowered, a reliable device is selected by referring to the instruction history, and the user is instructed to exchange the device.

According to this embodiment, when the reliability of instruction information from a device has lowered, the device is changed to another reliable device. It is therefore possible to continue detection of an instruction of the operator even if the reliability of instruction information detection has lowered.

Note that in this embodiment, an example will be described in which a device is basically connected to the USB (Universal Serial Bus) connector of a portable terminal such as a smartphone so as to easily install or change the device at the site. However, some devices may be connected to a desktop or notebook personal computer (to be referred to as a PC hereinafter), or may independently have a communication function to a cloud server.

<<User Instruction Recognition System>>

A user instruction recognition system 200 including a cloud server 210 that is an information processing apparatus according to this embodiment will be described with reference to FIGS. 2 to 4D.

(Outline of System)

Figure 2:
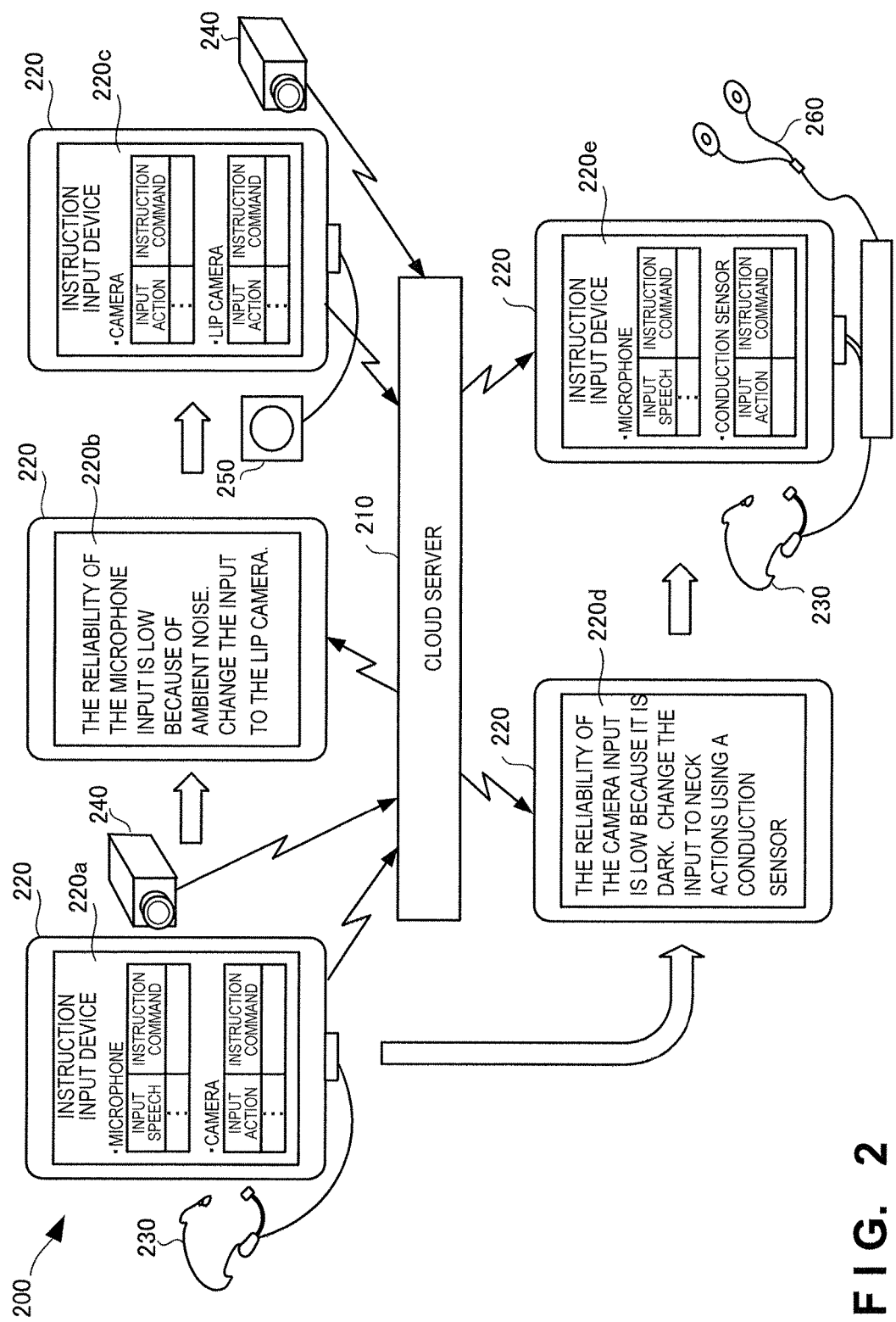
FIG. 2 is a view showing the outline of a user instruction recognition system including a cloud server according to the second embodiment of the present invention.

FIG. 2 is a view showing the outline of the user instruction recognition system 200 including the cloud server 210 according to this embodiment. Referring to FIG. 2, the cloud server 210 recognizes an instruction of a worker who is a user at an outdoor worksite based on instruction information acquired from a device connected to a portable terminal 220 that is a smartphone. The cloud server 210 determines the reliability of the instruction information from the device connected to the portable terminal 220, and if the reliability has lowered, instructs the portable terminal 220 to exchange the device.

Referring to FIG. 2, an earphone 230 with microphone is connected to the portable terminal 220 to detect a speech instruction of the worker. In addition, a video camera 240 having a communication function detects an action of the worker. A display screen 220a of the portable terminal 220 displays that an input speech from the microphone and an input action from the camera are used as the current instruction input of the worker, and also displays the association between a speech or action and an instruction command. Note that an explanation by speech is preferably done from the earphone of the earphone 230 with microphone at the same time as the display.

The cloud server 210 receives the input speech from the microphone and the input action from the camera as instruction information, refers to the accumulated history of instruction information, and recognizes the instruction of the worker. This obviates the necessity of instruction input using keys and the like and allows the worker to use both hands for the work.

If ambient noise increases during a work at a construction site or the like, the cloud server 210 determines that it is difficult to identify the speech of the worker from microphone input, and displays an instruction message "The reliability of the microphone input is low because of ambient noise. Change the input to the lip camera" on a display screen 220b of the portable terminal 220. Note that it can be determined that there is a difficulty in identifying the speech of the worker when the microphone input is stuck at a high level to disable speech extraction or when the instruction recognition ratio lowers. Although not illustrated in FIG. 2, tips to, for example, make the lip motion big may be displayed because the input is changed to the lip camera. The worker himself/herself or another worker exchanges the earphone 230 with microphone with a lip camera 250. The cloud server 210 recognizes the exchange with the lip camera 250, and recognizes an instruction of the worker using a lip change from the lip camera 250 and an input action from the camera as instruction information. A display screen 220c of the portable terminal 220 displays that a lip change from the lip camera and an input action from the camera are used as the current instruction input of the worker, and also displays the association between a lip change or action and an instruction command.

On the other hand, when it grows dark around the worksite in the evening, the cloud server 210 determines that it is difficult to identify the action of the worker from camera input, and displays an instruction message "The reliability of the camera input is low because it is dark. Change the input to neck actions using a conduction sensor" on a display screen 220d of the portable terminal 220. Note that it can be determined that there is a difficulty in identifying the action of the worker when the camera input is stuck at a low level to disable image extraction or when the instruction recognition ratio lowers. Although not illustrated in FIG. 2, tips about the neck action may be displayed because the input is changed to the neck action. The worker himself/herself or another worker connects the earphone 230 with microphone and a conduction sensor 260 to the portable terminal 220 via a router. The cloud server 210 determines the exchange with the conduction sensor 260, and recognizes an instruction of the worker using an electrical signal representing a neck motion from the conduction sensor 260 and an input action from the camera as instruction information. A display screen 220e of the portable terminal 220 displays that a neck motion from the conduction sensor and an input action from the camera are used as the current instruction input of the worker, and also displays the association between a neck motion or action and an instruction command.

Note that in FIG. 2, a decrease in the reliability of microphone input caused by ambient noise and a decrease in the reliability of camera input caused by darkening have been described. However, a device fault or a communication failure can also be determined by the cloud server 210 as a decrease in the reliability. For example, the level of a received signal, an instruction recognition ratio, or the like also serves as a reliability determination condition.

[Arrangement of System]

Figure 3:
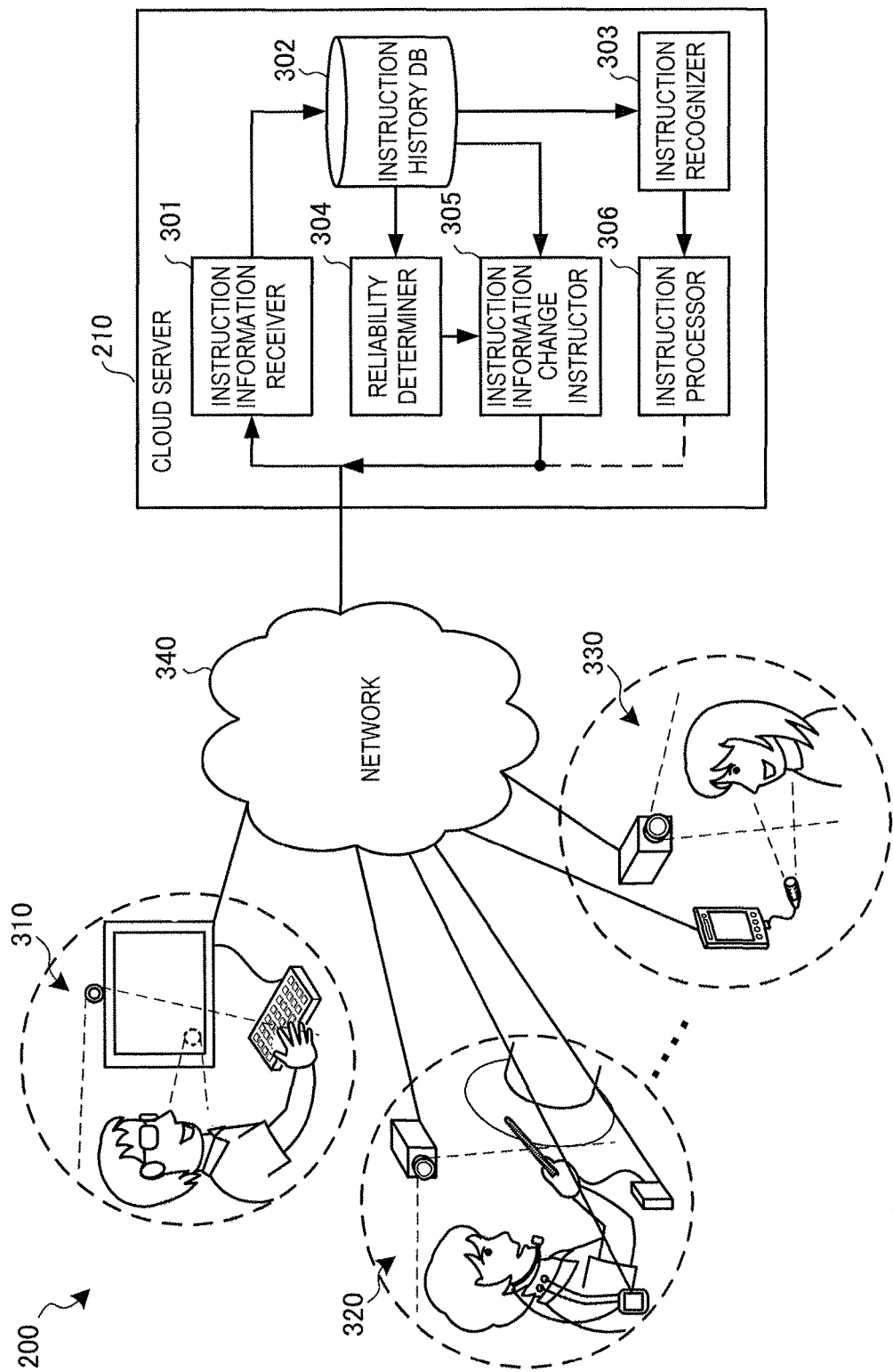
FIG. 3 is a view showing the arrangement of the user instruction recognition system including the cloud server according to the second embodiment of the present invention.

FIG. 3 is a view showing the arrangement of the user instruction recognition system 200 including the cloud server 210 according to this embodiment.

The user instruction recognition system 200 includes the cloud server 210 and various worksites 310 to 330 each having an instruction information acquisition device group configured to acquire the instruction information of a worker at the worksite, which are connected via a network 340. Note that in each instruction information acquisition device group, a device suitable for the worksite is selected. These devices may be connected to a portable terminal such as a smartphone or a PC, or may have an independent communication function. However, when device exchange or reserve device connection is taken into consideration, as in this embodiment, a portable terminal that has little restrictions on devices to be connected and is convenient to carry and easy to connect to the cloud server 210 is preferable.

The basic arrangement of the cloud server 210 according to this embodiment includes an instruction information receiver 301, an instruction history database (to be referred to as a DB hereinafter) 302, an instruction recognizer 303, a reliability determiner 304, an instruction information change instructor 305, and an instruction processor 306. The instruction information receiver 301 receives instruction information from an instruction information acquisition device group via the network 340. The instruction history DB 302 accumulates the history of instruction information received by the instruction information receiver 301 directly or, for example, after organization to associate the information with a work application to be used. The instruction recognizer 303 refers to the history of instruction information accumulated in the instruction history DB 302 and recognizes an instruction of the worker from the instruction information. The reliability determiner 304 refers to the history of instruction information accumulated in the instruction history DB 302 and determines the reliability of received instruction information. When the reliability determiner 304 determines that the reliability of received instruction information has lowered, the instruction information change instructor 305 instructs, from the portable terminal, the worker to change instruction information to be received. The instruction processor 306 processes an instruction of the worker recognized by the instruction recognizer 303. For example, if the instruction of the worker is an instruction to the cloud server 210, the instruction processor 306 executes a response operation by itself. If the instruction is an instruction to another device at the worksite, the instruction processor 306 performs an operation for the device. If the instruction is an instruction to an outside such as a work enforcement company or a company to which the worker belongs, the instruction processor 306 transmits the instruction message to the outside. The instruction of the worker is not limited to these.

(Operation Procedure of System)

Figure 4B:
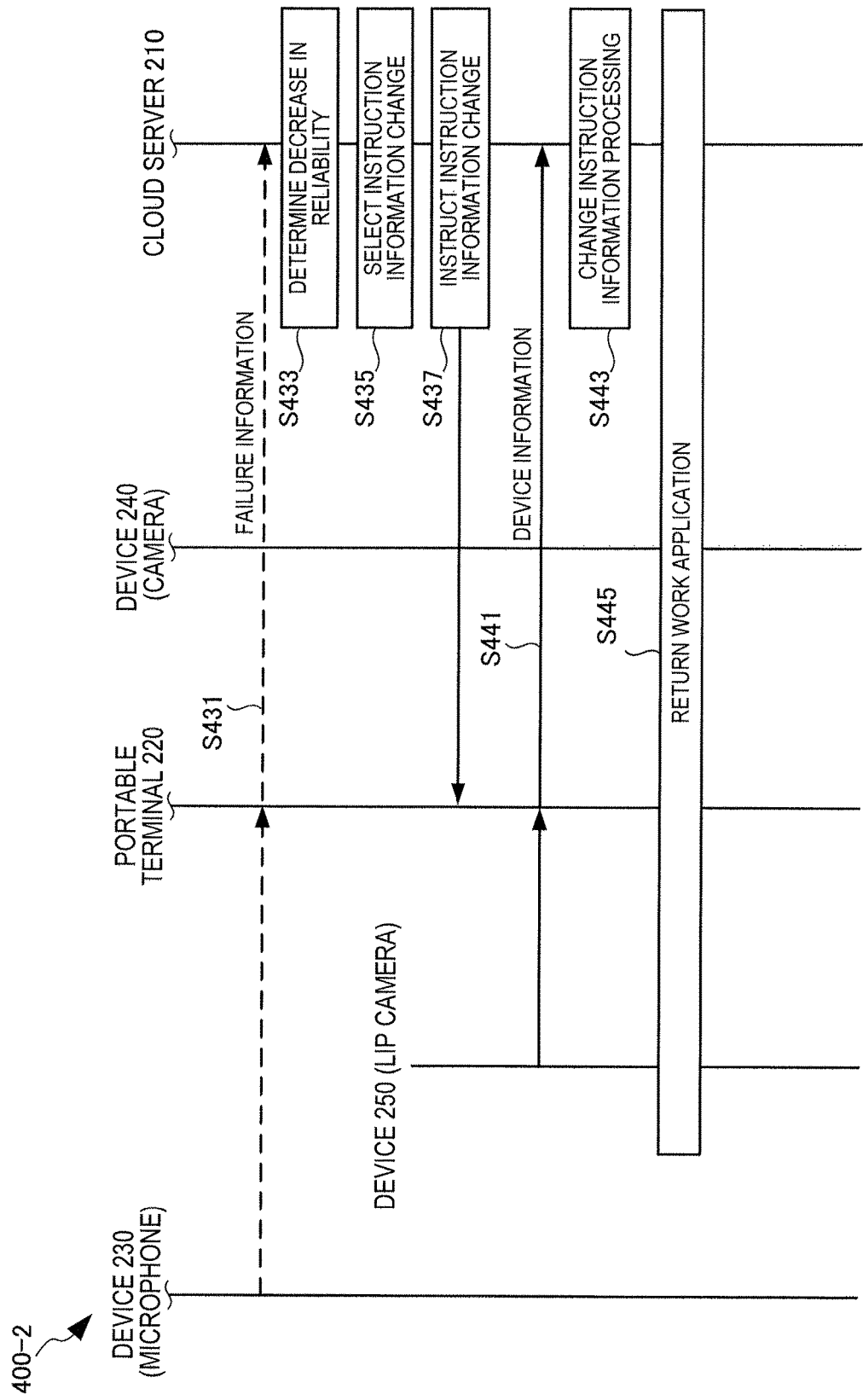
FIG. 4B is a sequence chart showing the operation procedure of the user instruction recognition system including the cloud server according to the second embodiment of the present invention.

FIGS. 4A and 4B are sequence charts showing operation procedures 400-1 and 400-2 of the user instruction recognition system 200 including the cloud server 210 according to this embodiment.

The operation procedure 400-1 shown in FIG. 4A is an operation procedure from work information input by the worker to work application activation and work processing by the cloud server 210 while recognizing an instruction from the worker.

In step S401, the portable terminal 220 of the worker transmits work information including work contents, working location, and working environment to the cloud server 210. In step S403, each device that detects instruction information transmits device information used to identify the device to the cloud server 210. In FIG. 4A, the earphone 230 with microphone transmits the device information to the cloud server 210 via the portable terminal 220, and the video camera 240 transmits the device information to the cloud server 210 directly using the communication function in accordance with the arrangement shown in FIG. 2.

In step S405, the cloud server 210 receives the work information from the portable terminal 220 and the device information from the connected devices, and selects a corresponding work application from a work application DB 407. In step S407, the work application is activated synchronously using the portable terminals and devices associated with the work, and the work at the site starts. The work application includes instruction information processing according to this embodiment which is processing of recognizing and processing an instruction of the worker.

Steps S409 to S423 represent the operation procedure of instruction information processing of recognizing and processing an instruction of the worker.

In step S409, the portable terminal 220 acquires speech information including a speech instruction of the worker from the earphone 230 with microphone and transmits it to the cloud server 210. In step S411, the cloud server 210 refers to the instruction history DB 302 and recognizes the speech instruction from the received speech information. In step S413, the cloud server 210 accumulates the speech information and the recognized speech instruction information in the instruction history DB 302.

In step S415, the video camera 240 acquires video information including an action instruction of the worker and transmits it to the cloud server 210. In step S417, the cloud server 210 refers to the instruction history DB 302 and recognizes the action instruction from the received video information. In step S419, the cloud server 210 accumulates the video information and the recognized action instruction information in the instruction history DB 302.

In step S421, the cloud server 210 refers to the instruction history in the instruction history DB 302 and recognizes the user instruction based on the combination of the recognized speech instruction and action instruction. The recognition result is accumulated in the instruction history DB 302 in association with the speech information, video information, and the like so as to be used for recognition later. In step S423, the cloud server 210 performs instruction response processing in accordance with the recognized instruction of the worker.

The operation procedure 400-2 shown in FIG. 4B is the operation procedure of instruction information change by device change in case where some failure has occurred to lower the reliability of the speech instruction from the earphone 230 with microphone.

In step S433, the cloud server 210 refers to the instruction history accumulated in the instruction history DB 302 and determines a decrease in the reliability of instruction information. Note that if the failure is, for example, a fault that can be determined by the device itself, failure information may be transmitted from the earphone 230 with microphone to the cloud server 210 to notify the failure, as in step S431.

In step S435, the cloud server 210 refers to the instruction history accumulated in the instruction history DB 302 and selects another appropriate instruction information when changing the instruction information. As the condition of another appropriate instruction information, for example, the instruction information raises the reliability of instruction recognition in combination with instruction information from the video of the video camera 240, the instruction information is prepared or can easily be prepared at the worksite, or the instruction information is not affected by a change in the environment of the worksite. However, the instruction information is not limited to these. Note that the cloud server 210 may present a list of effective instruction information and cause the worker to do selection.

In step S437, the cloud server 210 instructs, from the portable terminal 220, the worker to acquire and transmit the selected instruction information. If the instructed change is impossible, the portable terminal 220 may notify the cloud server 210, and another instruction information may further be selected (not shown).

In FIG. 4B, the lip camera 250 is connected to the portable terminal 220. In step S441, the portable terminal 220 acquires device information (for example, descriptors) from the lip camera 250 and transmits it to the cloud server 210 as a connection notification (for details, see FIGS. 4C and 4D). In step S443, the cloud server 210 receives the device information, recognizes that the change to instruction information from the lip camera 250 has been done, and performs instruction information processing using a different combination of instruction information to recognize the instruction of the worker. In step S445, a work application using portable terminals associated with the work and the changed device returns.

(Control Procedure of Connected Device)

Figure 4D:
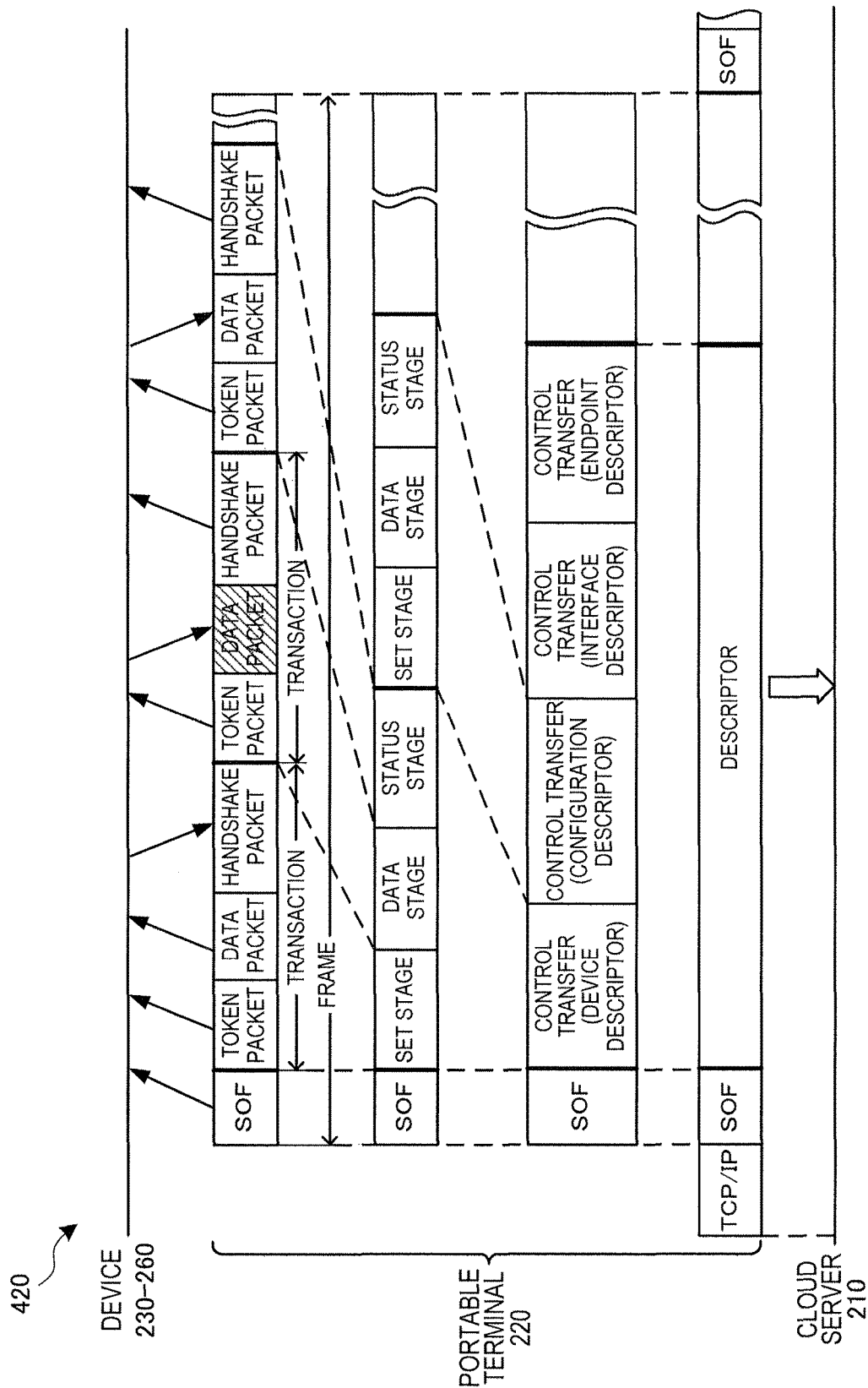
FIG. 4D is a sequence chart showing the control procedure of the USB-connected USB devices according to the second embodiment of the present invention.

FIGS. 4C and 4D are sequence charts showing control procedures 410 and 420 of the USB-connected devices 230 to 260 according to this embodiment.

FIG. 4C is a sequence chart showing the control procedure 410 when connecting the devices 230 to 260 to the USB connector of the portable terminal 220.

In step S451, the portable terminal 220 detects USB connection of the device. In step S453, the portable terminal 220 reads out descriptors from the device by a USB general-purpose driver. In step S455, the portable terminal 220 transmits the descriptor to the cloud server 210. After receiving the descriptors, the cloud server 210 refers to a device DB 413 and specifies the connected device from the descriptors in step S457. In step S459, the cloud server 210 refers to a device driver DB 414 and selects and activates a device driver based on the specified device.

In step S461, the portable terminal 220 detects USB connection of another device. In step S463, the portable terminal 220 reads out descriptors from the other device by a USB general-purpose driver. In step S465, the portable terminal 220 transmits the descriptor to the cloud server 210. In step S467, the cloud server 210 refers to the device DB 413 and specifies the connected device from the descriptors. In step S469, the cloud server 210 refers to the device driver DB 414 and selects and activates a device driver based on the specified device.

After that, as in FIG. 4A, the work application is activated in step S407. Note that FIG. 4A does not illustrate details, for example, when the work application is activated, the cloud server 210 provides a shared screen to each display in step S471. Additionally, if an input from each terminal or device is received, the cloud server 210 executes input response processing in step S473.

FIG. 4D is a sequence chart showing the control procedure 420 of acquiring the descriptors of the USB-connected devices.

The descriptors set in the devices 230 to 260 are acquired by a USB request such as GET_DESCRIPTOR. The USB request is exchanged with the devices 230 to 260 by control transfer. Each control transfer includes a set stage, a data stage, and a status stage. Each stage includes a token packet, a data packet, and a handshake packet. The descriptors are acquired by the data packet in each data stage.

The descriptors acquired from the devices 230 to 260 are IP-encapsulated in the IP header or TCP header and transmitted from the portable terminal 220 to the cloud server 210.

Note that the data input/output procedure of the USB device including the data output procedure from the cloud server 210 to the devices 230 to 260 and the data input procedure from the devices 230 to 260 to the cloud server 210 complies with the standard of the USB protocol, and a description thereof will be omitted.

<<Functional Arrangement of Cloud Server>>

Figure 5:
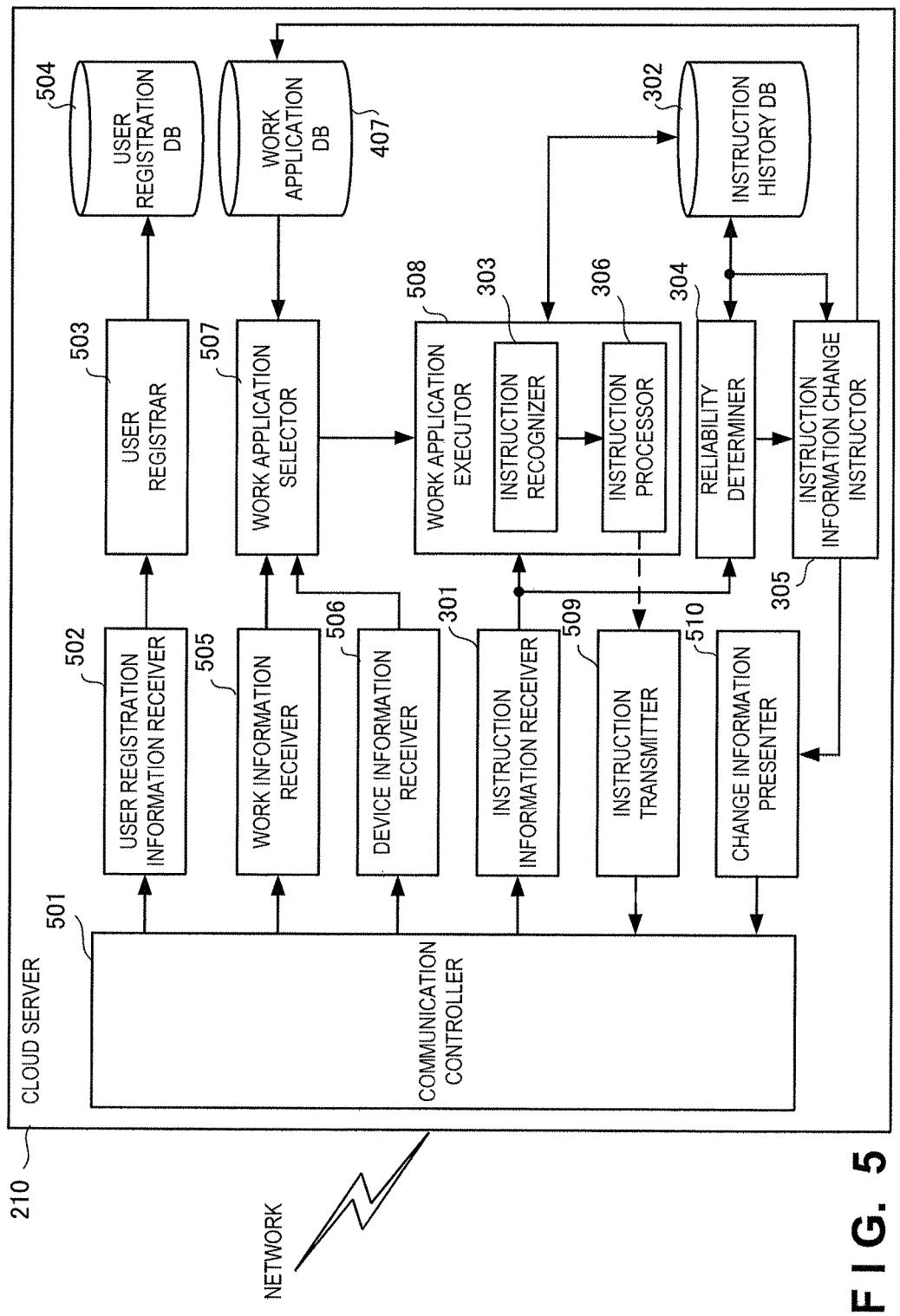
FIG. 5 is a block diagram showing the functional arrangement of the cloud server according to the second embodiment of the present invention.

FIG. 5 is a block diagram showing the functional arrangement of the cloud server 210 according to this embodiment.

The cloud server 210 includes a communication controller 501 that controls communication via the network 340. A user registration information receiver 502 receives received user registration information. For example, the user registration information includes information such as the nationality and language of the user, company to which the user belongs, address, age, and gender. A user registrar 503 registers, in a user registration DB 504, the user registration information received by the user registration information receiver 502 (see FIG. 7). A work information receiver 505 receives work information from the portable terminal 220. Note that the work information includes environment information of the worksite, and the work information receiver 505 also receives the environment information. A device information receiver 506 receives descriptors and the like used to identify a device from the device directly or via the portable terminal 220. A work application selector 507 selects a work application corresponding to work information and device information from the work application DB 407 (see FIG. 8) based on the work information and the device information.

A work application executor 508 executes the work application selected by the work application selector 507. The work application executor 508 includes the instruction recognizer 303 that refers to the instruction history DB 302 and recognizes an instruction of the worker from received instruction information, and the instruction processor 306 that performs processing in accordance with the recognized instruction of the worker. The recognition result of the instruction recognizer 303 is accumulated in the instruction history DB 302 in association with the instruction information. Note that the instruction recognizer 303 includes instruction information extraction that extracts instruction information intended by the user from received instruction information, and instruction content discrimination that discriminates the instruction contents of the extracted instruction information.

The instruction information receiver 301 receives instruction information detected by the device directly or via the portable terminal 220. The received instruction information is used for worker instruction recognition by the instruction recognizer 303 of the work application executor 508. The instruction information is also used for instruction information reliability determination of the reliability determiner 304. If the instruction information is an instruction of processing at the worksite, an instruction transmitter 509 transmits the instruction from the instruction processor 306 of the work application executor 508 to the device or portable terminal at the worksite.

The reliability determiner 304 determines the reliability of instruction information from the received instruction information and the instruction history accumulated in the instruction history DB 302. The reliability determiner 304 also accumulates the reliability determination result and the history of received instruction information in the instruction history DB 302 in association with each other. If the history of received instruction information corresponds to the accumulated history of instruction information, the reliability determiner 304 determines that the reliability has lowered. Upon determining that the reliability has lowered, the reliability determiner 304 notifies the instruction information change instructor 305 of the determination result. When notified of the decrease in the reliability by the reliability determiner 304, the instruction information change instructor 305 selects another instruction information by referring to the instruction history in the instruction history DB 302 and instructs to change the instruction information. A change information presenter 510 receives the change instruction from the instruction information change instructor 305 and presents, via the portable terminal 220, change information to the worker.

<<Functional Arrangement of Portable Terminal>>

Figure 6:
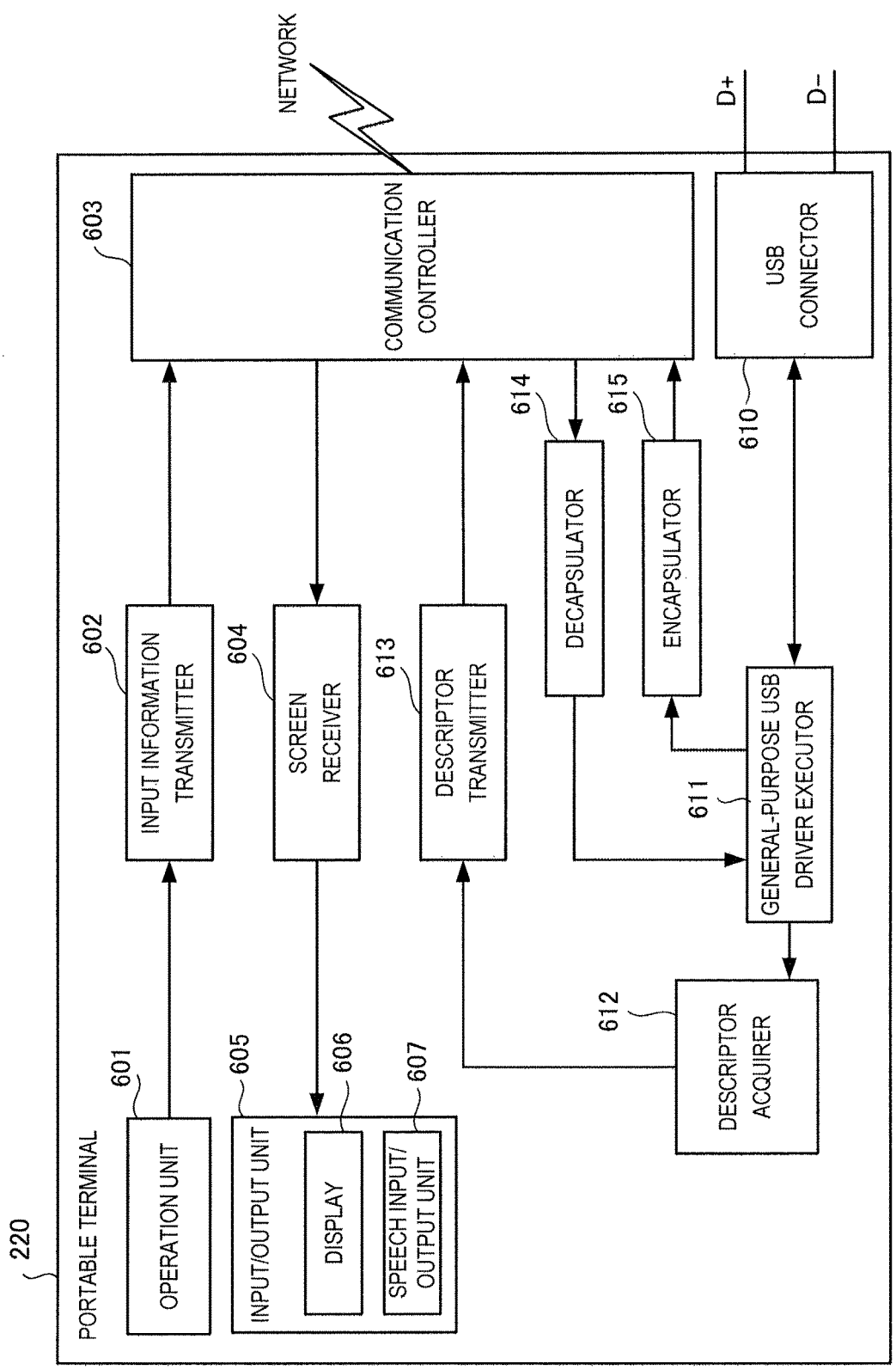
FIG. 6 is a block diagram showing the functional arrangement of a portable terminal according to the second embodiment of the present invention.

FIG. 6 is a block diagram showing the functional arrangement of the portable terminal 220 according to this embodiment.

The portable terminal 220 according to this embodiment includes a communication controller 603 that controls communication with the cloud server 210 via the network. The portable terminal 220 also includes an operation unit 601 formed from a touch panel and a keyboard, an input information transmitter 602 that transmits input information from the operation unit 601 to the cloud server 210, and an input/output unit 605. The input/output unit 605 includes a display 606 that displays a shared screen, work instruction screen, or instruction information change display screen that a screen receiver 604 has received from the cloud server 210, and a speech input/output unit 607 that inputs/outputs a speech. The input/output unit 605 may include a position generator by a camera or GPS (Global Positioning System).

The portable terminal 220 includes a USB connector 610 that is a device connector configured to connect a USB device. The portable terminal 220 also includes a general-purpose USB driver executor 611 configured to acquire the descriptors of the devices 230 to 260 connected to the USB connector 610. The portable terminal 220 also includes a descriptor acquirer 612 configured to acquire the descriptors of the devices 230 to 260 from a USB packet acquired by the general-purpose USB driver executor 611.

The portable terminal 220 also includes a descriptor transmitter 613 configured to transmit the descriptors of the devices 230 to 260 acquired by the descriptor acquirer 612 to the cloud server 210.

The portable terminal 220 also includes a decapsulator 614 and an encapsulator 615 configured to cause the cloud server 210 and the devices 230 to 260 connected to the USB connector 610 to exchange a USB packet via the general-purpose USB driver executor 611. The decapsulator 614 decapsulates an IP message from the cloud server 210. The encapsulator 615 performs IP-encapsulation to the cloud server 210. The general-purpose USB driver executor 611, the decapsulator 614, and the encapsulator 615 relay device control by the cloud server 210. Note that instruction information is also transmitted via this route.

In this embodiment, the input information transmitter 602 transmits work information and the like. The screen receiver 604 receives a screen to display currently acquired instruction information or a device change notification to change the device. If an operation unit or a display is connected to the USB connector 610 as a device, work information transmission and device information reception are performed in each device via the portable terminal 220.

Note that FIG. 6 illustrates a case where data transmission/reception between the cloud server 210 and the devices 230 to 260 is relayed. However, a device may be controlled by downloading a corresponding device driver from the cloud server 210.

(User Registration DB)

FIG. 7 is a view showing the arrangement of the user registration DB 504 according to this embodiment. A user who has input a registration request to the user instruction recognition system is registered in the user registration DB 504 by the user registrar 503. Note that the arrangement of the user registration DB 504 is not limited to that shown in FIG. 7.

The user registration DB 504 includes an individual user registrar 710 that registers an individual, and a group user registrar 720 that registers a group (legal person) such as a company.

The individual user registrar 710 of the user registration DB 504 stores a user authentication 712 such as a password, a nationality 713, a language 714, a group ID 715 of a belong group, an address 716, and other data 717 such as an age and a gender in association with a user ID 711 that is the identification information of a user.

The group user registrar 720 of the user registration DB 504 stores a group name 722 and work contents 723 in association with a group ID 721.

(Work Application DB)

FIG. 8 is a view showing the arrangement of the work application DB 407 according to the second embodiment of the present invention. Based on work information and device information, a work application appropriate for a work to be executed is selected from the work application DB 407 and executed. Note that the arrangement of the work application DB 407 is not limited to that shown in FIG. 8.

The work application DB 407 stores a group ID 802, work contents 803, a first connected device 804 for instruction, a second connected device 805 for instruction and the like as conditions to select a work application ID 801 to identify a work application.

(Instruction History DB)

The characteristic arrangement of the instruction history DB 302 according to this embodiment will be described with reference to FIGS. 9A to 9E. Note that the arrangement of the instruction history DB 302 is not limited to those shown in FIGS. 9A to 9E. To clarify a data structure visible when using the instruction history DB 302 according to this embodiment, five arrangements organized in accordance with purposes will be described below as the arrangement of the instruction history DB 302. However, the five arrangements are not individually organized and accumulated. FIGS. 9A to 9E illustrate the arrangement of the instruction history DB 302 for the sake of clarity, and the instruction history DB 302 may have an arrangement in which the data of all items are put together and linked so as to enable a search for each other.

FIG. 9A is a view showing an arrangement 910 of the instruction history DB 302 according to this embodiment in which the instruction histories are accumulated on a work application basis. That is, pieces of instruction information are directly accumulated for each work application currently under execution without being organized. Referring to FIG. 9A, a group ID 912 and a user ID 913 are stored in association with a work application ID 911. First connected device information 915 including a device ID and instruction information and second connected device information 916 including a device ID and instruction information are stored in association with an instruction information acquisition date/time 914. A user instruction 917 recognized from the combination of instruction information and information 918 representing whether the recognition has succeeded or failed are stored. The accumulation of the information 918 is organized and used to determine the accuracy and reliability of instruction recognition by a combination or select instruction information to be changed.

Figure 9B:
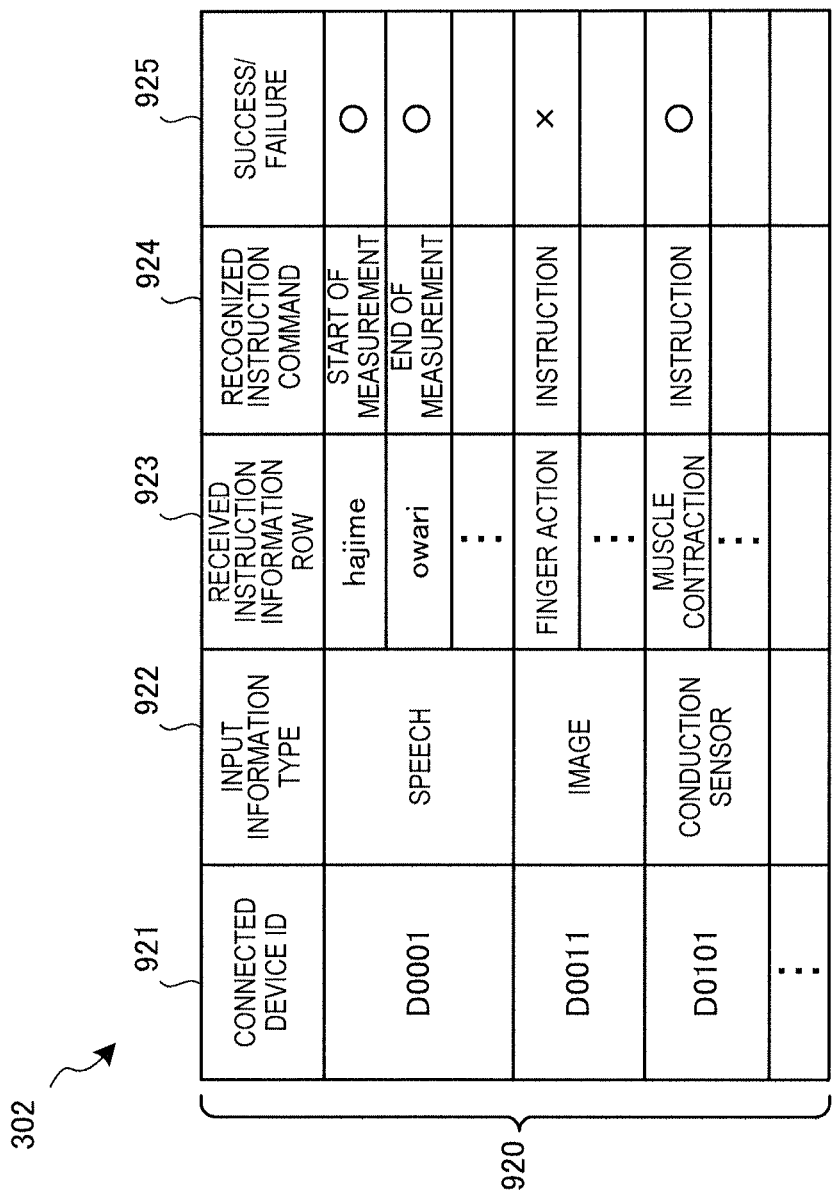
FIG. 9B is a view showing the arrangement of the instruction history DB according to the second embodiment of the present invention.

FIG. 9B is a view showing an arrangement 920 of the instruction history DB 302 according to this embodiment in which the instruction histories are organized on a connected device basis. Referring to FIG. 9B, an input information type 922 is stored in association with a connected device ID 921. In association with a received instruction information row 923, an instruction command 924 recognized from the instruction information row and information 925 representing whether the recognition of the instruction command has succeeded or failed are stored. Accumulation of the information 925 is used to determine the tendency of the connected device or reliability or select instruction information to be changed.

FIG. 9C is a view showing an arrangement 930 of the instruction history DB 302 according to this embodiment in which the instruction histories are organized on an instruction information combination basis. Referring to FIG. 9C, a recognized user instruction 933, a recognition success count 934, and a recognition failure count 935 are stored in association with instruction information 931 of the first connected device, instruction information 932 of the second connected device, . . . . The accumulation and the ratio of the success count 934 and the failure count 935 are used to determine the accuracy and reliability of instruction recognition by a combination or select the instruction method of the worker.

FIG. 9D is a view showing an arrangement 940 of the instruction history DB 302 according to this embodiment in which the instruction histories are organized on a work application basis. Referring to FIG. 9D, a sequence 942 in which a user instruction appears and a combination 943 of user instructions that appear in the work are stored in association with a work application ID 941. A user instruction 944 that does not appear in the work, a user instruction 945 whose appearance ratio in the work is high, a user instruction 946 whose appearance ratio in the work is low, and the like are also stored. For example, when recognizing an instruction of the worker, the sequence, combination and, appearance ratios are referred to determine whether the instruction is possible or impossible. On the other hand, these pieces of information represent the tendency of a work application. The reliability is suspected to be low in case of large deviation from the information.

Figure 9E:
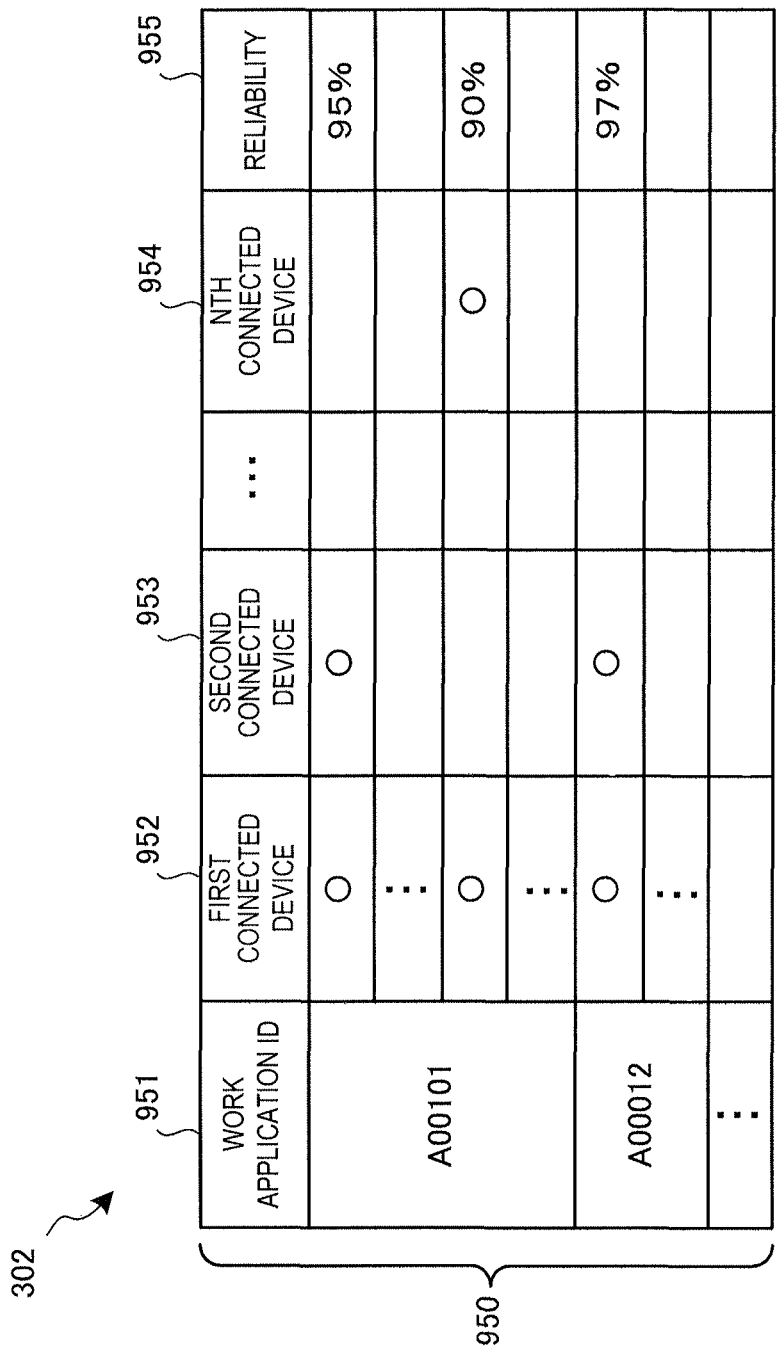
FIG. 9E is a view showing the arrangement of the instruction history DB according to the second embodiment of the present invention.

FIG. 9E is a view showing an arrangement 950 of the instruction history DB 302 according to this embodiment in which the instruction histories are organized based on a combination of devices that detect instruction information. Referring to FIG. 9E, a combination of used devices is stored in association with a work application ID 951. The combinations of used devices are indicated by ○ in the cells of a first connected device 952, a second connected device 953, . . . , a nth connected device 954. A reliability 955 of recognition of an instruction of the worker is stored in association with the device combination. These pieces of information present a more appropriate device combination for a work or a work application and instruction recognition and serve to select devices when proposing an initial combination or changing instruction information.

(Device Driver DB)

Figure 10:
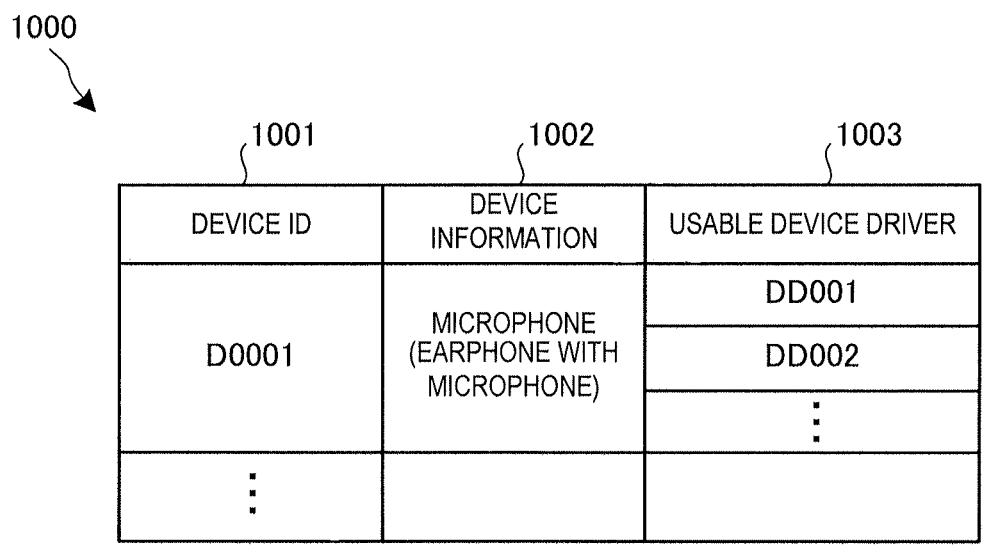
FIG. 10 is a view showing the arrangement of a device driver DB according to the second embodiment of the present invention.

FIG. 10 is a view showing the arrangement of the device driver DB 414 according to this embodiment. The device driver DB 414 stores a device driver used to drive a device that acquires instruction information in a work application selected by work information. Note that the arrangement of the device driver DB 414 is not limited to that shown in FIG. 10.

The device driver DB 414 stores device information 1002 such as device performance and version, and a plurality of usable device drivers 1003 in association with a device ID 1001 that specifies a device.

Note that the device DB 413 shown in FIG. 4C is self-evident for those who are skilled in the art, and an illustration and description thereof will be omitted here.

<<Hardware Arrangement of Cloud Server>>

Figure 11:
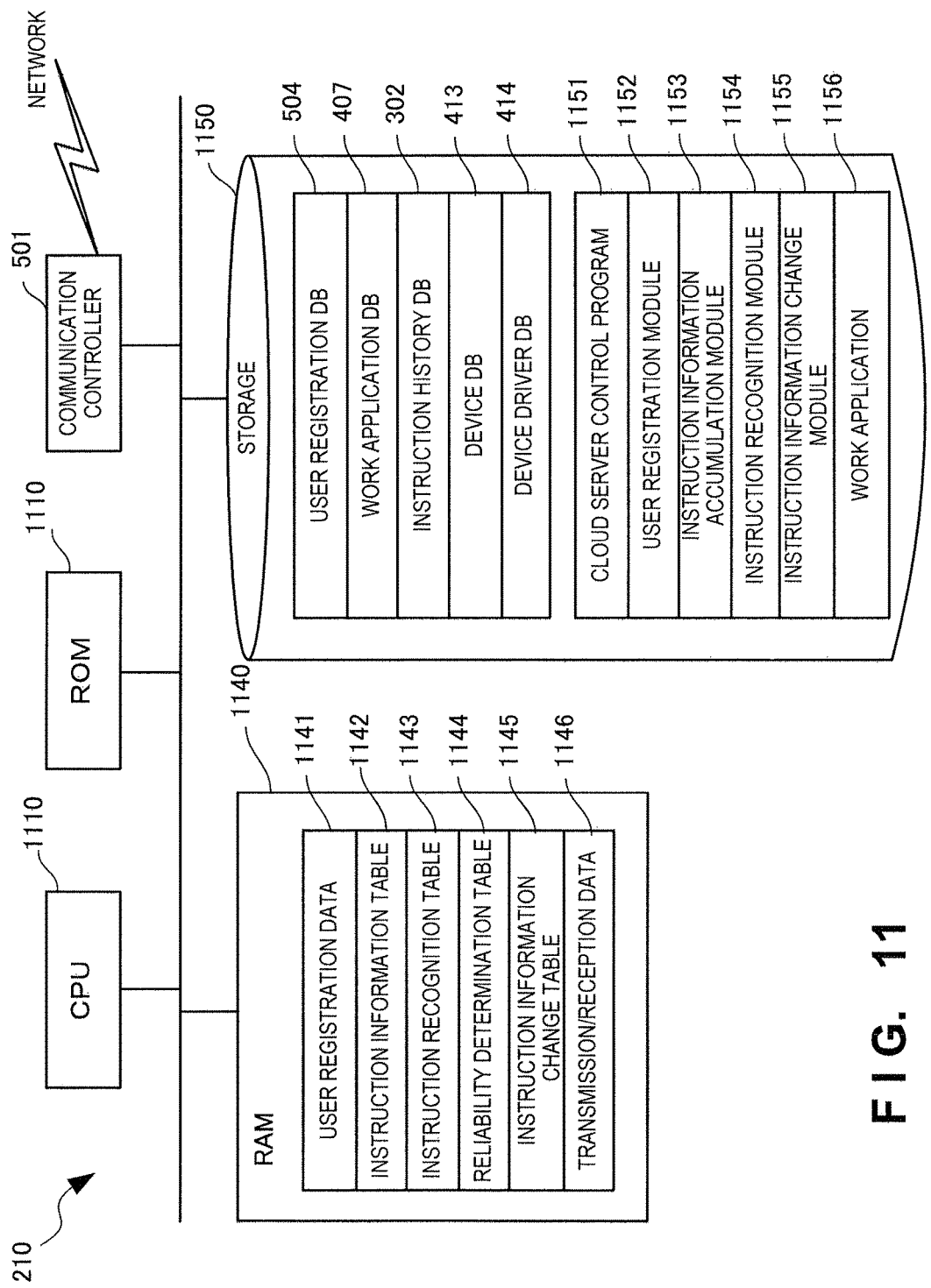
FIG. 11 is a block diagram showing the hardware arrangement of the cloud server according to the second embodiment of the present invention.

FIG. 11 is a block diagram showing the hardware arrangement of the cloud server 210 according to this embodiment.

In FIG. 11, a CPU (Central Processing Unit) 1110 is a processor for arithmetic control, and implements the functional components of the cloud server 210 shown in FIG. 5 by executing a program. A ROM 1120 stores initial data, permanent data of programs and the like, and programs. The communication controller 501 communicates with the portable terminal 220 via the network 340. Note that the number of CPUs 1110 is not limited to one, and the CPU 1110 may include a plurality of CPUs or a GPU (Graphics Processing Unit) for image processing. The communication controller 501 preferably includes a CPU independent of the CPU 1110 and writes or reads transmission/reception data in or from an area of a RAM 1140. It is preferable to provide a DMAC (Direct Memory Access Controller) (not shown) that transfers data between the RAM 1140 and a storage 1150. Hence, the CPU 1110 recognizes data reception by or transfer to the RAM 1140 and processes data. In addition, the CPU 1110 prepares the processing result in the RAM 1140 and leaves subsequent transmission or transfer to the communication controller 501 or the DMAC.

The RAM (Random Access Memory) 1140 is a random access memory used by the CPU 1110 as a work area for temporary storage. An area to store data necessary for implementation of the embodiment is allocated to the RAM 1140. User registration data 1141 is data for user registration received from the portable terminal 220. An instruction information table 1142 is a table configured to store instruction information representing an instruction of the worker received from the devices 230 to 260 or the like (see FIG. 12). An instruction recognition table 1143 is a table configured to recognize the instruction of the worker from the received instruction information (see FIG. 13). A reliability determination table 1144 is a table configured to determine the reliability of instruction information by referring to the instruction history in the instruction history DB 302 (see FIG. 14). An instruction information change table 1145 is a table configured to select another instruction information by referring to the instruction history in the instruction history DB 302 in case of a decrease in the reliability of instruction information (see FIG. 15). Transmission/reception data 1146 is data that the communication controller 501 transmits/receives via the network 340. Note that the storage location of the transmission/reception data 1146 is assumed to be specified in correspondence with each data type.

The storage 1150 stores databases, various kinds of parameters, and following data and programs necessary for implementation of the embodiment. The user registration DB 504 is the database shown in FIG. 7, which registers a user. The work application DB 407 is the database shown in FIG. 8, which stores a work application in correspondence with work information and device information. The instruction history DB 302 is the database shown in FIGS. 9A to 9E, which accumulates the history of instruction information acquired from each device. The device DB 413 is a database used to specify a device from descriptors, as shown in FIG.

4C. The device driver DB 414 is the database shown in FIG. 10, which stores a device driver in correspondence with a device.

The storage 1150 stores the following programs. A cloud server control program 1151 is a program that controls the entire cloud server 210. A user registration module 1152 is a module that performs user registration requested by a communication terminal in the cloud server control program 1151. An instruction information accumulation module 1153 is a module that receives instruction information of a worker detected by each device during a work and accumulates it in the instruction history DB 302 in the cloud server control program 1151. An instruction recognition module 1154 is a module that refers to the instruction history DB 302 and recognizes an instruction of a worker for the combination of received instruction information in the cloud server control program 1151. An instruction information change module 1155 is a module that changes instruction information to be received in case of a decrease in the reliability of received instruction information in the cloud server control program 1151. A work application 1156 is a program read out from the work application DB 407 and executed.

Note that programs and data associated with general-purpose functions and other implementable functions of the cloud server 210 are not shown in the RAM 1140 or the storage 1150 of FIG. 11.

(Instruction Information Table)

Figure 12:
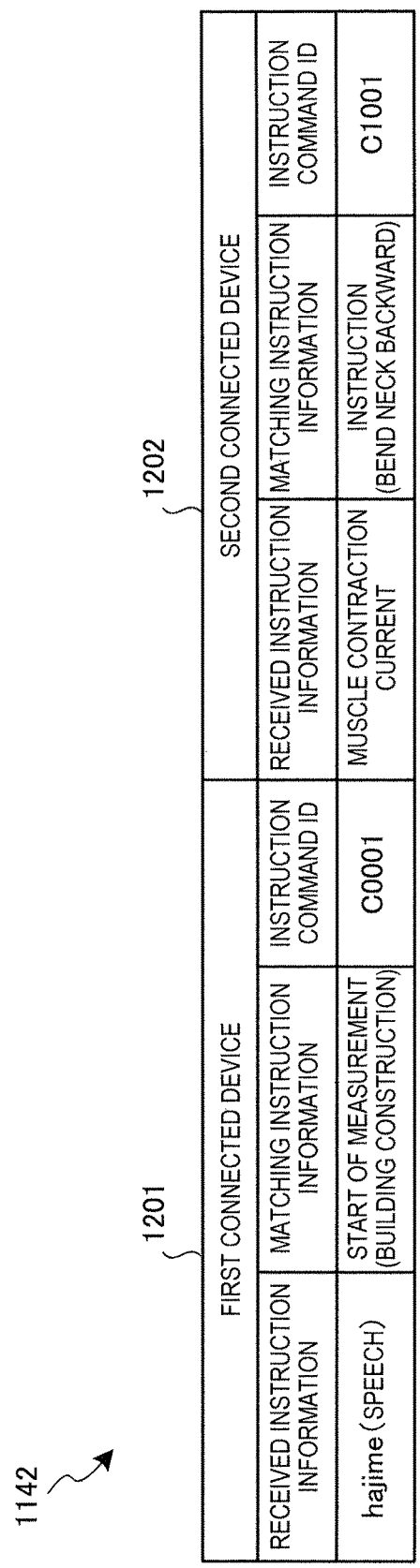
FIG. 12 is a view showing the arrangement of an instruction information table according to the second embodiment of the present invention.

FIG. 12 is a view showing the arrangement of the instruction information table 1142 according to this embodiment. The instruction information table 1142 is a table that receives and stores instruction information detected by each device and is used by the instruction information receiver 301 or the instruction recognizer 303.

The instruction information table 1142 stores a first connected device 1201 and a second connected device 1202 each of which includes received instruction information, instruction information that matches it, and an instruction command ID extracted from the instruction information based on the matching result. Note that the number of connected devices is not limited to two.

(Instruction Recognition Table)

FIG. 13 is a view showing the arrangement of the instruction recognition table 1143 according to this embodiment. The instruction recognition table 1143 is a table used to recognize an instruction of a worker by combining received instruction information and is used by the instruction recognizer 303.

The instruction recognition table 1143 stores an instruction command ID 1301 recognized n times before, an instruction command ID 1302 recognized (n−1) times before, . . . , an instruction command ID 1303 recognized last time, an instruction command ID 1304 of the first connected device, and an instruction command ID 1305 of the second connected device. The instruction recognition table 1143 also stores an instruction command ID 1306 recognized from the combination of the information, and instruction contents 1307. Note that the combination of the instruction command of the first connected device and the instruction command of the second connected device is taken into consideration as the combination for recognition. In addition, for example, instruction commands of this time are narrowed down in consideration of the previous instruction commands, or instruction commands of this time are narrowed down by grasping the progress of the work based on the sequence of instruction commands from n times before.

(Reliability Determination Table)

FIG. 14 is a view showing the arrangement of the reliability determination table 1144 according to this embodiment. The reliability determination table 1144 is a table configured to determine the reliability of received instruction information by referring to the instruction history DB 302 and is used by the reliability determiner 304.

The reliability determination table 1144 stores the current device state in association with a device ID 1401 and a device type 1402 of a device connected to detect instruction information. The current device state includes, for example, absence 1403 of a signal from the device, instruction information discrimination disable 1404, and environment information 1405 detected by the device or another device. The instruction information discrimination disable 1404 is a state in which instruction information representing an instruction of a worker cannot be extracted, which includes a case where instruction information from a microphone cannot be discriminated because of ambient noise or internal noise and a case where no worker can be discriminated from the background because of strong color or light or darkening. In consideration of the current device state, a reliability level 1406 is determined and stored.

(Instruction Information Change Table)

Figure 15:
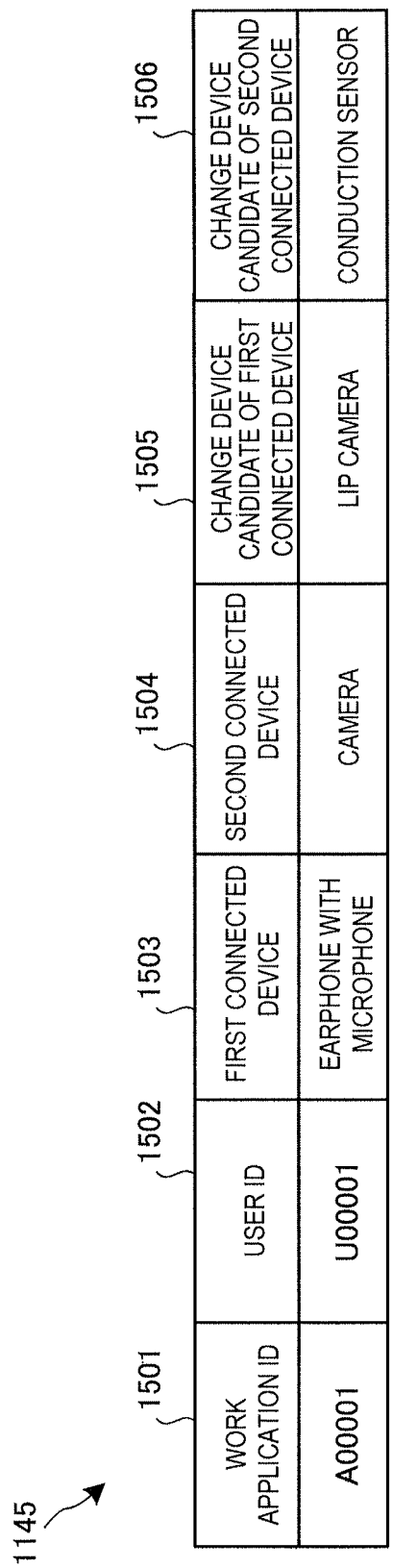
FIG. 15 is a view showing the arrangement of an instruction information change table according to the second embodiment of the present invention.

FIG. 15 is a view showing the arrangement of the instruction information change table 1145 according to this embodiment. The instruction information change table 1145 is a table configured to select another instruction information by referring to the instruction history DB 302 in case of a decrease in the reliability of instruction information.

The instruction information change table 1145 stores a first connected device 1503, a second connected device 1504, a device candidate 1505 to be changed from the first connected device, and a device candidate 1506 to be changed from the second connected device in association with a work application ID 1501 and a user ID 1502.

<<Processing Procedure of Cloud Server>>

FIG. 16 is a flowchart showing the processing procedure of the cloud server 210 according to this embodiment. This flowchart is executed by the CPU 1110 shown in FIG. 11 using the RAM 1140 and implements the functional components shown in FIG. 5. Note that a description will be made using, as an example, an arrangement in which the CPU 1110 recognizes data reception by or transfer to the RAM 1140 and processes data, and also prepares the processing result in the RAM 1140 and leaves subsequent transmission or transfer to the communication controller 501 to DMAC.

In step S1601, the CPU 1110 determines whether to perform initialization such as selection of a work application and a device driver. When performing initialization, the CPU 1110 advances to step S1603 to execute initialization processing (see FIG. 17A). In step S1605, the CPU 1110 determines whether instruction information is received from a device or portable terminal. If instruction information is received, the CPU 1110 advances to step S1607 to execute instruction information accumulation processing (see FIG. 17B).

In step S1609, the CPU 1110 determines whether the reliability of the received instruction information has lowered. If the reliability has not lowered, the CPU 1110 advances to step S1611 to execute instruction information recognition processing using the received instruction information (see FIG. 17C). In step S1613, the CPU 1110 executes instruction corresponding processing corresponding to the recognized instruction of the worker. If the reliability has lowered, the CPU 1110 advances to step S1615 to execute instruction information change processing of changing the instruction information of lower reliability to another instruction information (see FIG. 17D).

(Initialization Processing)

Figure 17A:
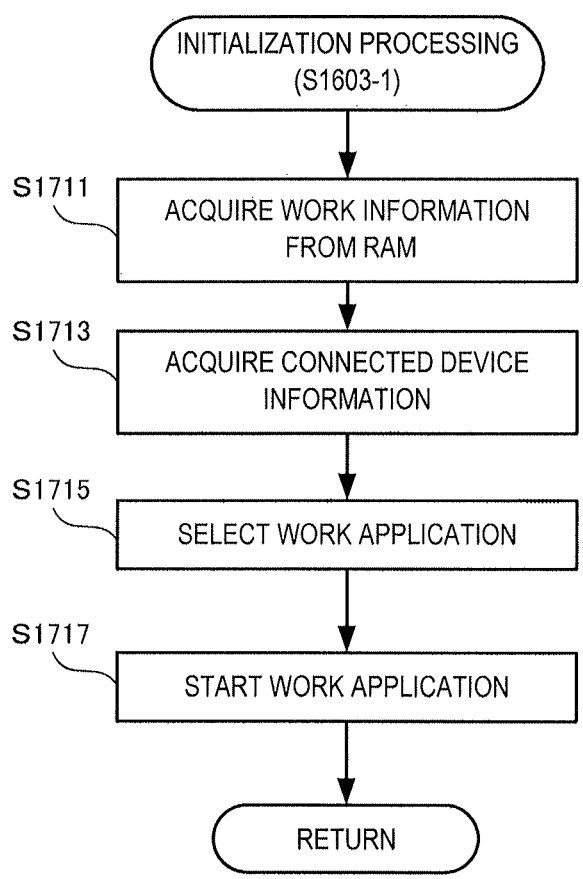
FIG. 17A is a flowchart showing the procedure of initialization processing according to the second embodiment of the present invention.

FIG. 17A is a flowchart showing the procedure of initialization processing (S1603-1) according to this embodiment.

In step S1711, the CPU 1110 acquires work information from the transmission/reception data 1146 in the RAM 1140. In step S1713, the CPU 1110 acquires connected device information connected to detect work information. In step S1715, the CPU 1110 selects a work application from the work application DB 407 based on the work information and the connected device information. In step S1717, the CPU 1110 starts the selected work application. Note that a device driver may also be selected in correspondence with the selection of the work application. The device driver may be downloaded to a driver receiver in the portable terminal 220.

(Instruction Information Accumulation Processing)

Figure 17B:
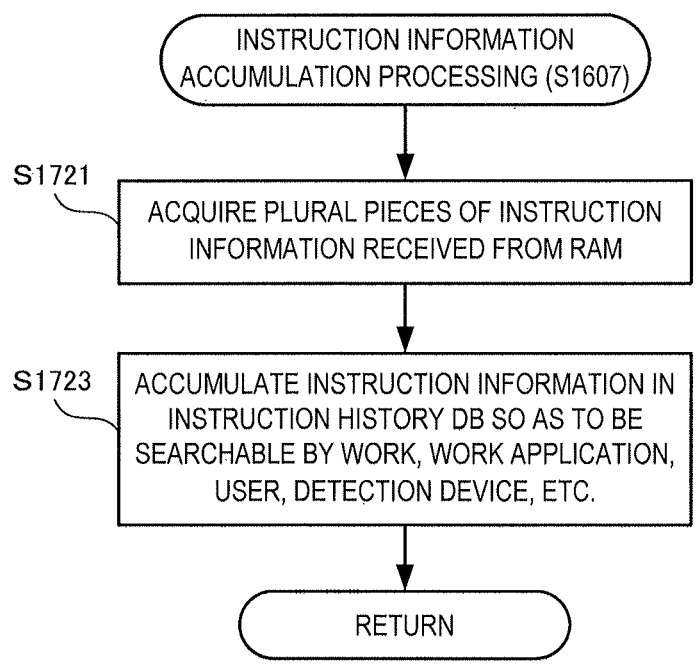
FIG. 17B is a flowchart showing the procedure of instruction information accumulation processing according to the second embodiment of the present invention.

FIG. 17B is a flowchart showing the procedure of instruction information accumulation processing (S1607) according to this embodiment.

In step S1721, the CPU 1110 acquires a plurality of pieces of received instruction information from the transmission/reception data 1146 in the RAM 1140. In step S1723, the CPU 1110 accumulates the received instruction information in the instruction history DB 302 so as to be searchable by a work type, work application, user, connected device for detection, or the like.

(Reliability Determination Processing)

Figure 17C:
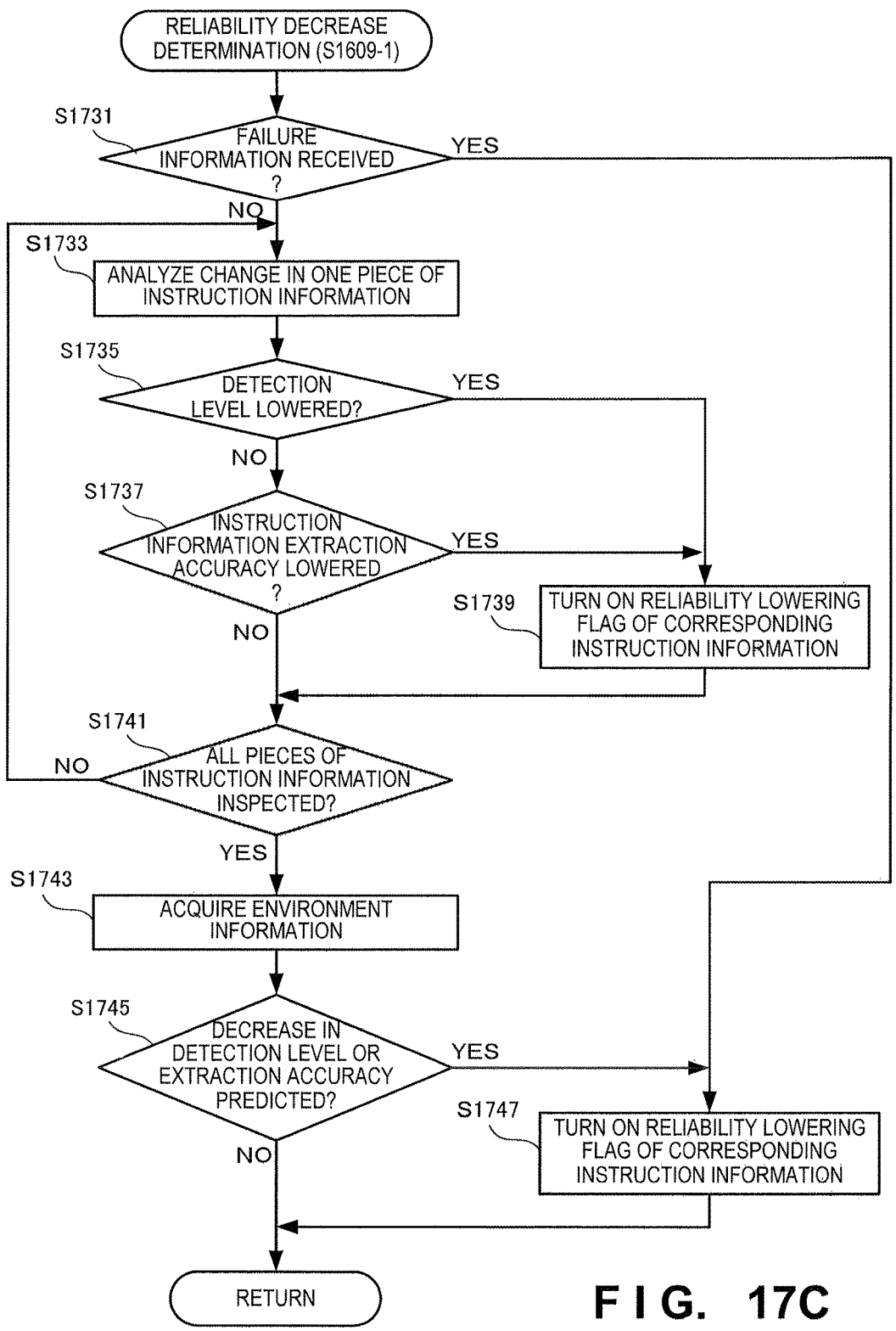
FIG. 17C is a flowchart showing the procedure of reliability determination processing according to the second embodiment of the present invention.

FIG. 17C is a flowchart showing the procedure of reliability determination processing (S1609-1) according to this embodiment.

In step S1731, the CPU 1110 determines whether failure information is received from the connected device for detection. Upon receiving failure information, the CPU 1110 advances to step S1747 to turn on the reliability decrease flag of corresponding instruction information.

If no failure information is received, the CPU 1110 advances to step S1733 to select one piece of instruction information and analyze the long-term and short-term changes of the instruction information. In step S1735, the CPU 1110 determines whether the signal detection level has lowered. If the signal detection level has not lowered, the CPU 1110 advances to step S1737 to determine whether the instruction information extraction accuracy has lowered. If the extraction accuracy has not lowered, the CPU 1110 advances to step S1741 to determine whether all pieces of instruction information currently detected in the work have been inspected. If the inspection is not completed, the CPU 1110 returns to step S1733 to analyze and inspect the change of another instruction information. Upon determining in step S1735 that the detection level has lowered, or upon determining in step S1737 that the extraction accuracy has lowered, the CPU 1110 advances to step S1739 to turn on the reliability decrease flag of corresponding instruction information.

If the inspection of all pieces of instruction information currently detected in the work is completed, the CPU 1110 advances to step S1743 to acquire environment information. The environment information includes ambient noise or internal noise, weather such as rain or snow, and light and darkness. Every condition that affects instruction information detection of the detection device is included. In step S1745, the CPU 1110 predicts a decrease in the detection level or extraction accuracy in the future for the acquired environment information. If a decrease in the detection level or extraction accuracy is predicted, the CPU 1110 advances to step S1747 to turn on the reliability decrease flag of corresponding instruction information.

Note that although the prediction is done based on the environment information, how long it takes to get dark in the season may simply be predicted from the current time. Alternatively, the cloud server 210 may acquire a weather forecast or the state around the worksite and predict a change in the environment.

(Instruction Information Recognition Processing)

FIG. 17D is a flowchart showing the procedure of instruction information recognition processing (S1611) according to this embodiment.

In step S1751, the CPU 1110 acquires instruction information from one device. In step S1753, the CPU 1110 compares the instruction information with the instruction information of an instruction command and recognizes the instruction command of the acquired instruction information. In step S1755, the CPU 1110 determines the presence/absence of a contradiction between the instruction command recognition result and a past instruction command. If no contradiction exists, the CPU 1110 advances to step S1757 to determine the instruction command by the instruction information from one device. If a contradiction exists, the CPU 1110 does not perform the process of step S1757. In step S1759, the CPU 1110 determines whether another device is connected. If another device is connected, the CPU 1110 returns to step S1751 to repeat recognition of instruction information from the other device.

If no other device exists, the CPU 1110 advances to step S1761 to recognize the instruction of the worker who is the user from the combination of the instruction commands of the plurality of devices determined by the repeat.

(Instruction Information Change Processing)

Figure 17E:
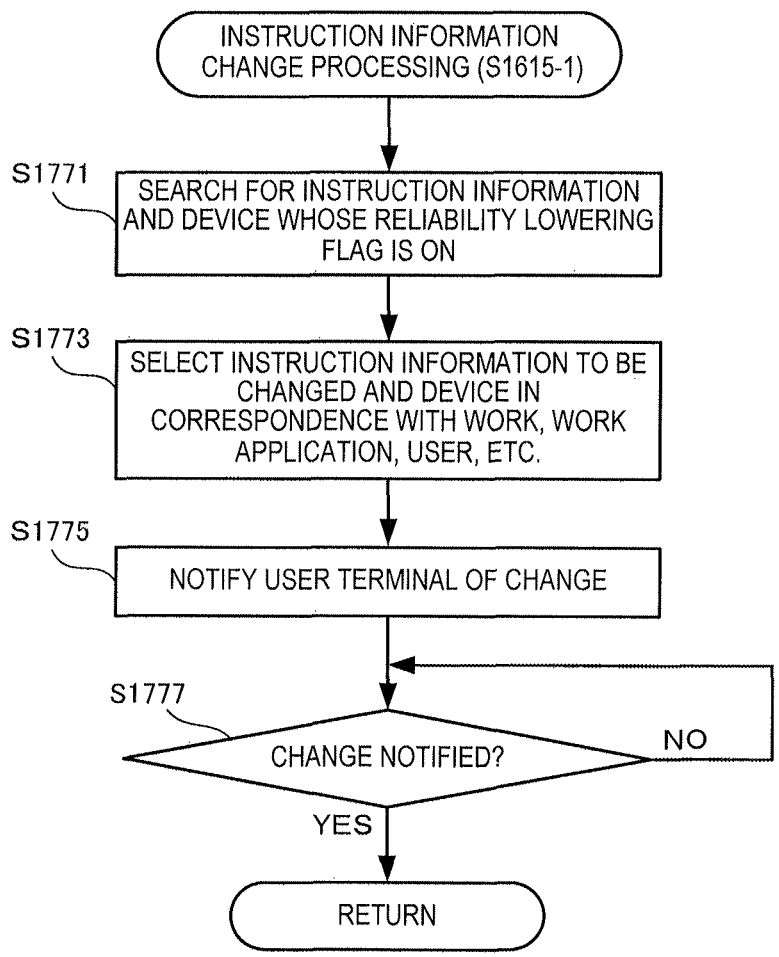
FIG. 17E is a flowchart showing the procedure of instruction information change processing according to the second embodiment of the present invention.

FIG. 17E is a flowchart showing the procedure of instruction information change processing (S1615-1) according to this embodiment.

In step S1771, the CPU 1110 searches for instruction information and a device whose reliability decrease flag is on. In step S1773, the CPU 1110 selects instruction information to be changed and a device thereof in correspondence with the work type, work application, user, and the like. Note that the selection conditions include the user because the reliability of instruction information changes depending on the habit of the worker who is the user. When the instruction history DB 302 according to this embodiment is referred to, the habit of the worker and the like can also be learned and considered.

<<Hardware Arrangement of Portable Terminal>>

Figure 18:
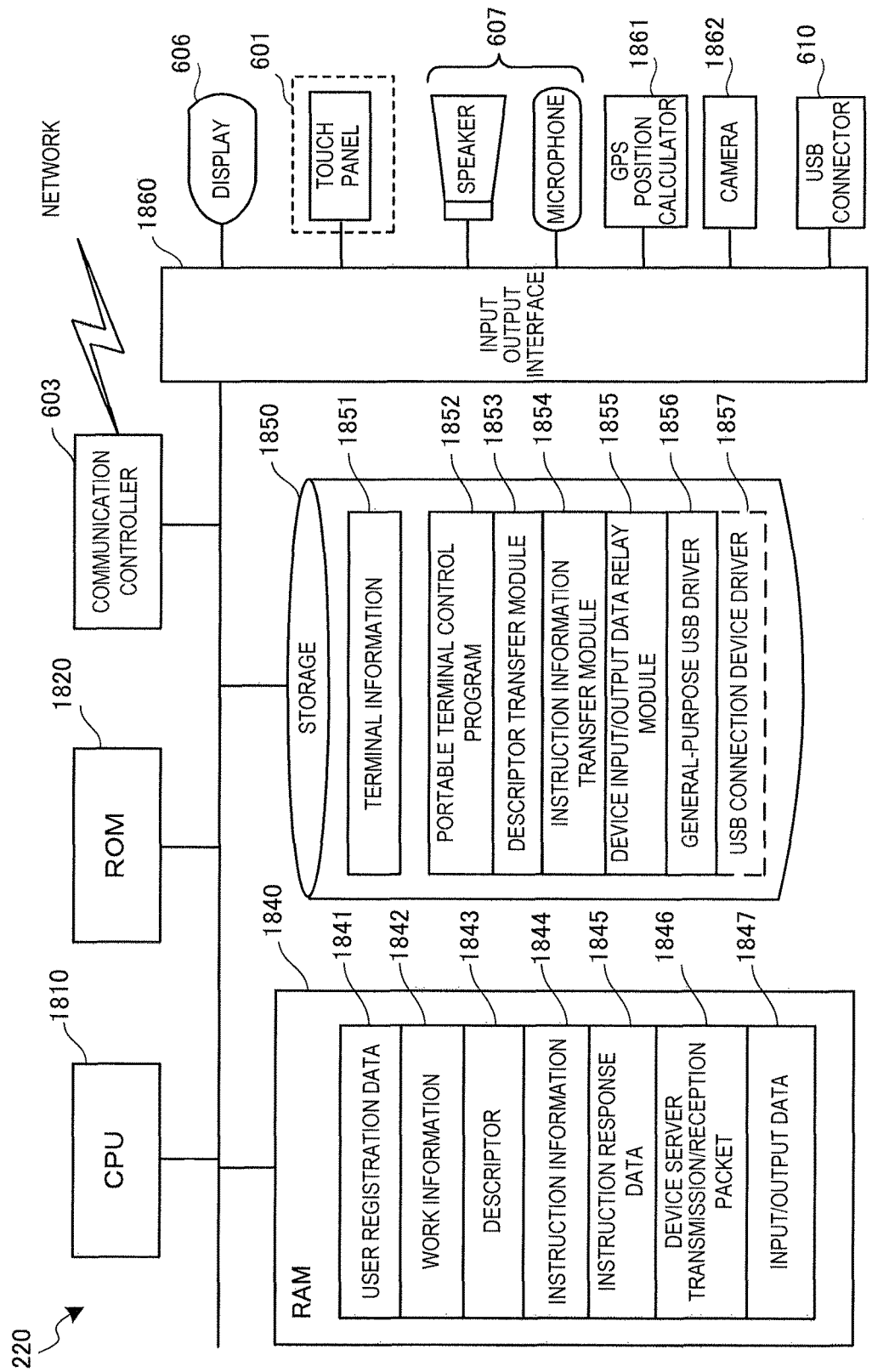
FIG. 18 is a block diagram showing the hardware arrangement of the portable terminal according to the second embodiment of the present invention.

FIG. 18 is a block diagram showing the hardware arrangement of the portable terminal 220 according to this embodiment.

Referring to FIG. 18, a CPU 1810 is a processor for arithmetic control, and implements the functional components of the portable terminal 220 shown in FIG. 6 by executing a program. A ROM 1820 stores initial data, permanent data of programs and the like, and programs. The communication controller 603 communicates with the cloud server 210 via the network 340. Note that the number of CPUs 1810 is not limited to one, and the CPU 1810 may include a plurality of CPUs or a GPU for image processing. The communication controller 603 preferably includes a CPU independent of the CPU 1810 and writes or reads transmission/reception data in or from an area of a RAM 1840. It is preferable to provide a DMAC (not shown) that transfers data between the RAM 1840 and a storage 1850. An input/output interface 1860 preferably includes a CPU independent of the CPU 1810 and writes or reads input/ output data in or from an area of the RAM 1840. Hence, the CPU 1810 recognizes data reception by or transfer to the RAM 1840 and processes data. In addition, the CPU 1810 prepares the processing result in the RAM 1840 and leaves subsequent transmission or transfer to the communication controller 603, the DMAC, or the input/output interface 1860.

The RAM 1840 is a random access memory used by the CPU 1810 as a work area for temporary storage. An area to store data necessary for implementation of the embodiment is allocated to the RAM 1840. User registration data 1841 is data input by the user for user registration in the cloud server 210. Work information 1842 is information used to specify a work, which is input to the portable terminal 220 by a worker. A descriptor 1843 is device information read out from a device connected to the USB connector 610. Instruction information 1844 is information acquired from the device from the worker who is the user and represents an instruction of the worker to be transmitted to the cloud server 210. Instruction response data 1845 is data that is received from the cloud server 210 and responds to the instruction of the worker recognized from the instruction information. A device server transmission/reception packet 1846 includes a packet input/output to/from the USB device, and an IP-encapsulated packet transmitted/received to/from the cloud server 210 via the communication controller 603. Input/output data 1847 is data input/output via the input/output interface 1860.

The storage 1850 stores databases, various kinds of parameters, and following data and programs necessary for implementation of the embodiment. Terminal information 1851 is information including the identifier of the communication terminal. The storage 1850 stores the following programs. A portable terminal control program 1852 is a control program that controls the entire portable terminal 220. A descriptor transfer module 1853 is a module that transfers descriptors acquired from a connected device to the cloud server 210. An instruction information transfer module 1854 is a module configured to transfer instruction information detected by a connected device to the cloud server 210. A device input/output data relay module 1855 is a module that relays data input/output between the cloud server 210 and a connected device. A general-purpose USB driver 1856 is a program that executes a basic USB protocol such as device descriptor read. A USB connection device driver 1857 is a program downloaded from the cloud server 210 when the portable terminal has a function of executing a device driver. Note that if the portable terminal can share part of a work application, the program may be stored in the storage 1850.

The input/output interface 1860 interfaces input/output data from/to input/output devices. The display 606 and the operation unit 601 including a touch panel are connected to the input/output interface 1860. The speech input/output unit 607 such as a speaker and a microphone is also connected. In addition, a GPS position generator 1861, a camera 1862, and the like are connected. Furthermore, the USB connector 610 is connected.

Note that programs and data associated with general-purpose functions and other implementable functions of the portable terminal 220 are not shown in the RAM 1840 or the storage 1850 of FIG. 18.

<<Processing Procedure of Portable Terminal>>

Figure 19:
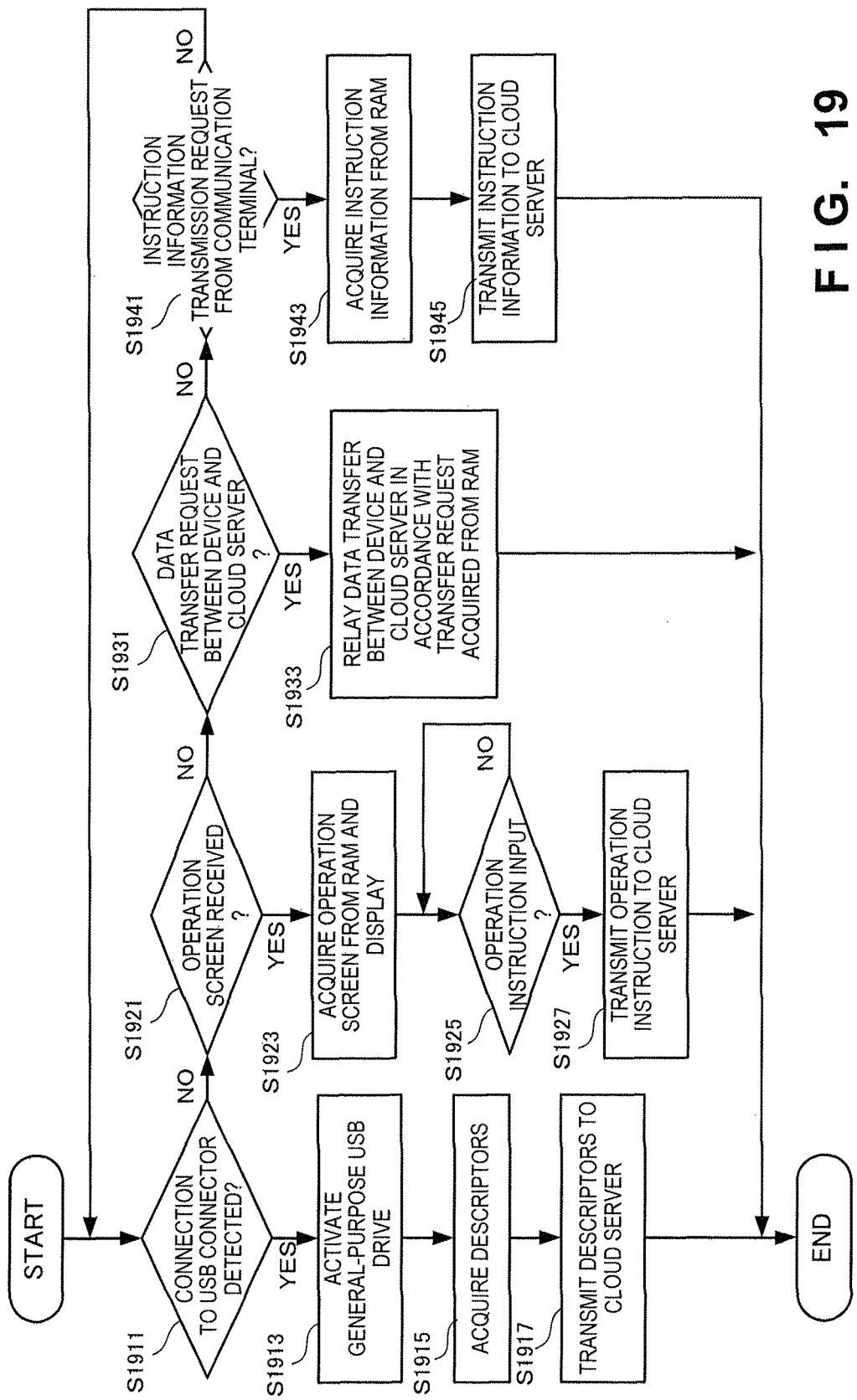
FIG. 19 is a flowchart showing the processing procedure of the portable terminal according to the second embodiment of the present invention.

FIG. 19 is a flowchart showing the processing procedure of the portable terminal 220 according to this embodiment. This flowchart is executed by the CPU 1810 shown in FIG. 18 using the RAM 1840 and implements the functional components shown in FIG. 6.

When an event occurs, the CPU 1810 determines the contents of the event. In step S1911, the CPU 1810 determines whether a device is connected to the USB connector. If no device is connected to the USB connector, the CPU 1810 determines in step S1921 whether an operation screen is received from the cloud server 210. If no device is connected to the USB connector, and no operation screen is received, the CPU 1810 determines in step S1931 whether data addressed to the device is received from the cloud server 210 or data from the device is received. If no device is connected to the USB connector, no operation screen is received, and no data transfer is performed, the CPU 1810 determines in step S1941 whether a transmission request of instruction information detected by the portable terminal or connected device is input.

If a device is connected to the USB connector, the CPU 1810 advances from step S1911 to step S1913, and activates a general-purpose USB drive. In step S1915, the CPU 1810 acquires the descriptors of the device. In step S1917, the CPU 1810 transmits the acquired descriptors to the cloud server 210.

If an operation screen is received, the CPU 1810 advances from step S1921 to step S1923, acquires the operation screen from the RAM 1840, and displays it on the display 606. In step S1925, the CPU 1810 waits for operation input of the user. If operation input of the user is received, the CPU 1810 advances to step S1927, acquires an operation instruction from the input/output data 1847 in the RAM 1840, and instructs the communication controller 603 to transmit it to the cloud server 210.

If a transfer request of data addressed to the device from the cloud server 210 or a reception request of data addressed to the cloud server 210 from the device is input, the CPU 1810 advances from step S1931 to step S1933. In step S1933, the CPU 1810 instructs data transfer of the device server transmission/reception packet 1846 in the RAM 1840 to the device or cloud server 210.

Upon determining that an instruction information transmission request is received, the CPU 1810 advances from step S1941 to step S1943, acquires the instruction information from the input/output data 1847 in the RAM 1840, and stores it in the instruction information 1844. In step S1945, the CPU 1810 instructs the communication controller 603 to transmit the instruction information 1844 to the cloud server 210.

According to this embodiment, change to a reliable device is done in accordance with a decrease in the reliability of instruction information from a device. It is therefore possible to continue detection of an instruction of an operator even if the reliability of instruction information detection has lowered.

Third Embodiment

A user instruction recognition system including a cloud server that is an information processing apparatus according to the third embodiment of the present invention will be described next. The cloud server according to this embodiment is different from the second embodiment in that the cloud server itself changes instruction information of lower reliability to another instruction information, instead of instructing a worker to change the instruction information of lower reliability to another instruction information. The rest of the components and operations is the same as in the second embodiment. Hence, the same reference numerals denote the same components and operations, and a detailed description thereof will be omitted.

According to this embodiment, change to a reliable device is automatically done in accordance with a decrease in the reliability of instruction information from a device. It is therefore possible to continue detection of an instruction without the operation of an operator even if the reliability of instruction information detection has lowered.

<<User Instruction Recognition System>>

A user instruction recognition system 2000 including a cloud server 2010 that is an information processing apparatus according to this embodiment will be described with reference to FIGS. 20 to 22.

(Outline of System)

FIG. 20 is a view showing the outline of the user instruction recognition system 2000 including the cloud server 2010 according to this embodiment. Referring to FIG. 20, the cloud server 2010 recognizes an instruction of a worker who is a user at an outdoor worksite based on instruction information acquired from a device connected to a portable terminal 220 that is a smartphone. The cloud server 2010 determines the reliability of the instruction information from the device connected to the portable terminal 220, and if the reliability has lowered, switches the device to receive instruction information to a reliable device compatible with instruction information to be combined.

Referring to FIG. 20, an earphone 230 with microphone, a lip camera 250, and a conduction sensor 260 are connected to the portable terminal 220 via a router. The earphone 230 with microphone detects a speech instruction of the worker. The lip camera 250 shoots the motion of the lip corresponding to words of the worker. The conduction sensor 260 is set on the neck of the worker and detects the motion of the muscle of the neck. In addition, a video camera 240 having a communication function detects an action instruction of the worker. A display screen 220*a* of the portable terminal 220 displays that an input speech from the microphone and an input action from the camera are used as the current instruction input of the worker, and also displays the association between a speech or action and an instruction command, as in FIG. 2. Note that an explanation by a speech is preferably done from the earphone of the earphone 230 with microphone at the same time as the display.

The cloud server 2010 receives the input speech from the microphone and the input action from the camera as instruction information, refers to the accumulated history of instruction information, and recognizes the instruction of the worker. This obviates the necessity of instruction input using keys and the like and allows the worker to use both hands for the work.

If ambient noise increases during a work at a construction site or the like, the cloud server 2010 determines that it is difficult to identify the speech of the worker from microphone input. The cloud server 2010 switches the instruction information detection source to the lip camera 250, receives a lip change from the lip camera 250 and an input action from the video camera 240 as instruction information, refers to the accumulated history of instruction information, and recognizes the instruction of the worker. The cloud server 2010 displays an instruction message "The reliability of the microphone input is low because of ambient noise. The input is changed to the lip camera" on a display screen 220*f* of the portable terminal 220. Note that although not illustrated in FIG. 20, tips to, for example, make the lip motion big may be displayed because the input is changed to the lip camera. As in FIG. 2, a display screen 220*c* of the portable terminal 220 displays that a lip change from the lip camera and an input action from the camera are used as the current instruction input of the worker, and also displays the association between a lip change or action and an instruction command.

On the other hand, when it grows dark around the worksite in the evening, the cloud server 2010 determines that it is difficult to identify the action of the worker from camera input. The cloud server 2010 switches the instruction information detection source to the conduction sensor 260, receives an electrical signal representing a neck motion from the conduction sensor 260 and an input action from the camera as instruction information, and recognizes the instruction of the worker. The cloud server 2010 displays an instruction message "The reliability of the camera input is low because it is dark. The input is changed to neck actions using a conduction sensor. Bend the neck backward to make an instruction" on a display screen 220*g* of the portable terminal 220. A display screen 220*e* of the portable terminal 220 displays that a neck motion from the conduction sensor and an input action from the camera are used as the current instruction input of the worker, and also displays the association between a neck motion or action and an instruction command.

Note that in FIG. 20, a decrease in the reliability of microphone input caused by ambient noise and a decrease in the reliability of camera input caused by darkening have been described for the sake of comparison with FIG. 2. However, a device fault or a communication failure can also be determined by the cloud server 2010 as a decrease in the reliability. For example, the level of a received signal, an instruction recognition ratio, or the like also serves as a reliability determination condition.

[Arrangement of System]

Figure 21:
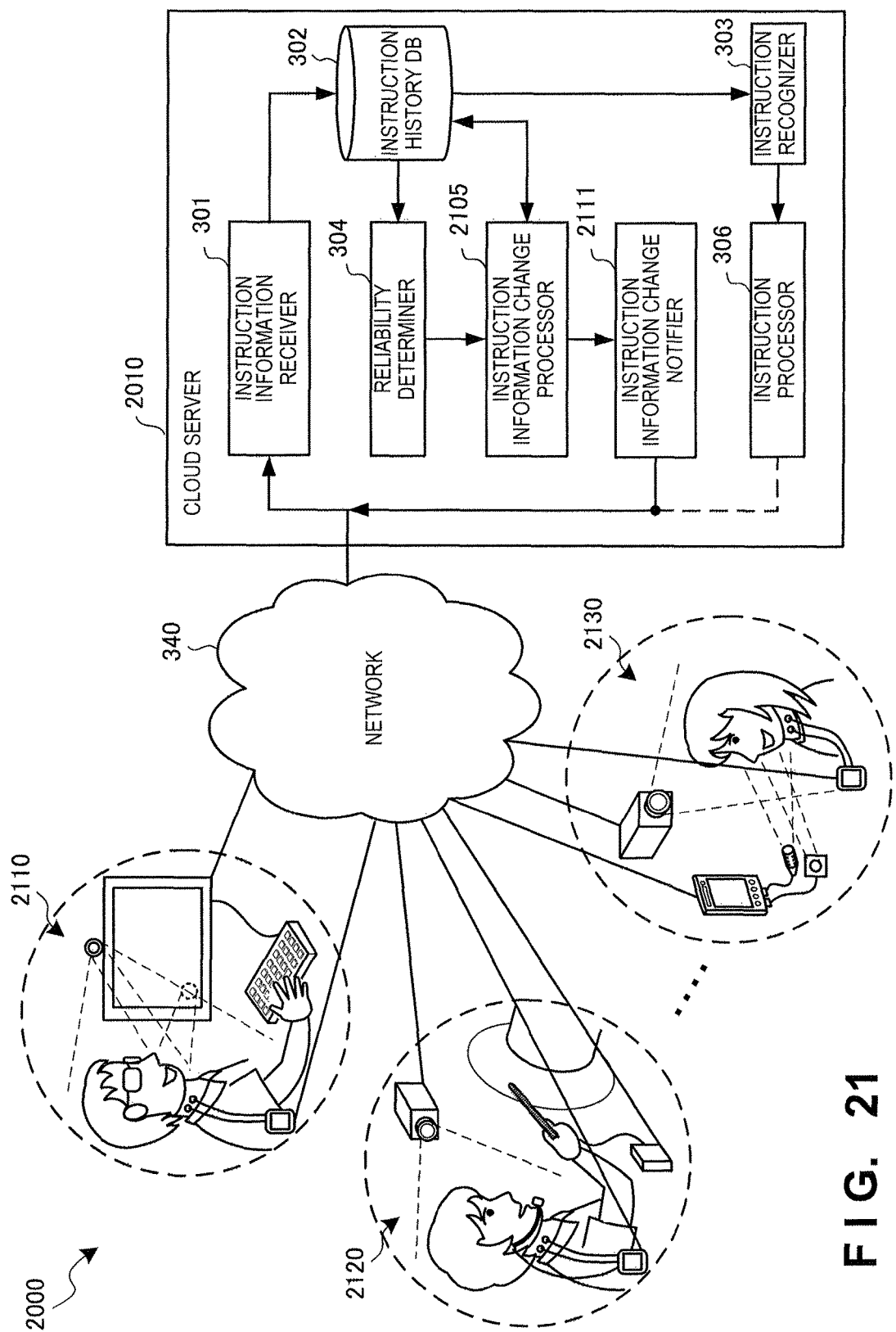
FIG. 21 is a view showing the arrangement of the user instruction recognition system including the cloud server according to the third embodiment of the present invention.

FIG. 21 is a view showing the arrangement of the user instruction recognition system 2000 including the cloud server 2010 according to this embodiment. Note that the same reference numerals as in FIG. 3 denote the same constituent elements in FIG. 21, and a description thereof will be omitted.

The user instruction recognition system 2000 includes the cloud server 2010 and various worksites 2110 to 2130 each having an instruction information acquisition device group configured to acquire the instruction information of a worker at the worksite, which are connected via a network 340. Note that in this embodiment, all preparable and connectable devices that detect instruction information are connected as much as possible by workers at the worksites 2110 to 2130. This aims at preventing instruction information switching by the cloud server 2010 from being delayed by an unconnected device.

The basic arrangement of the cloud server 2010 according to this embodiment includes an instruction information change processor 2105 configured to cause the cloud server 2010 to switch instruction information of lower reliability, in addition to the functional components of the cloud server 210 shown in FIG. 2. The cloud server 2010 also includes an instruction information change notifier 2111 configured to cause the portable terminal 220 to notify the worker of a change of instruction information by the cloud server 2010.

(Operation Procedure of System)

Figure 22:
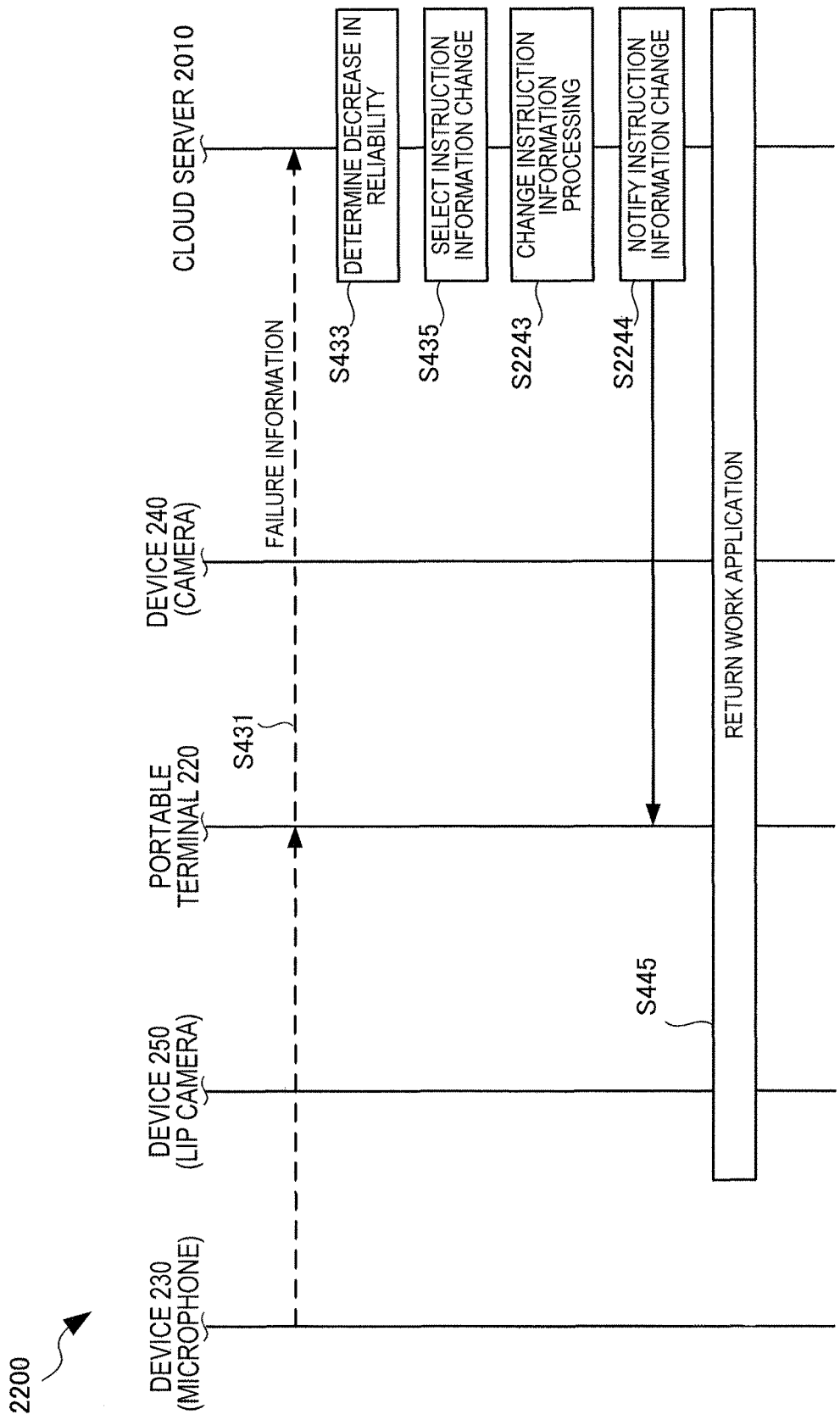
FIG. 22 is a sequence chart showing the operation procedure of the user instruction recognition system including the cloud server according to the third embodiment of the present invention.

FIG. 22 is a sequence chart showing an operation procedure 2200 of the user instruction recognition system 2000 including the cloud server 2010 according to this embodiment. Note that the same step numbers as in FIG. 4B denote the same steps in FIG. 22, and a description thereof will be omitted. Although FIG. 22 corresponds to FIG. 4B, FIGS. 4A, 4C, and 4D that are other sequence charts are also quoted in this embodiment as well.

In step S2243, the cloud server 2010 automatically changes instruction information processing by switching instruction information. In step S2244, the cloud server 2010 notifies the portable terminal 220 that the instruction information is changed.

<<Functional Arrangement of Cloud Server>>

Figure 23:
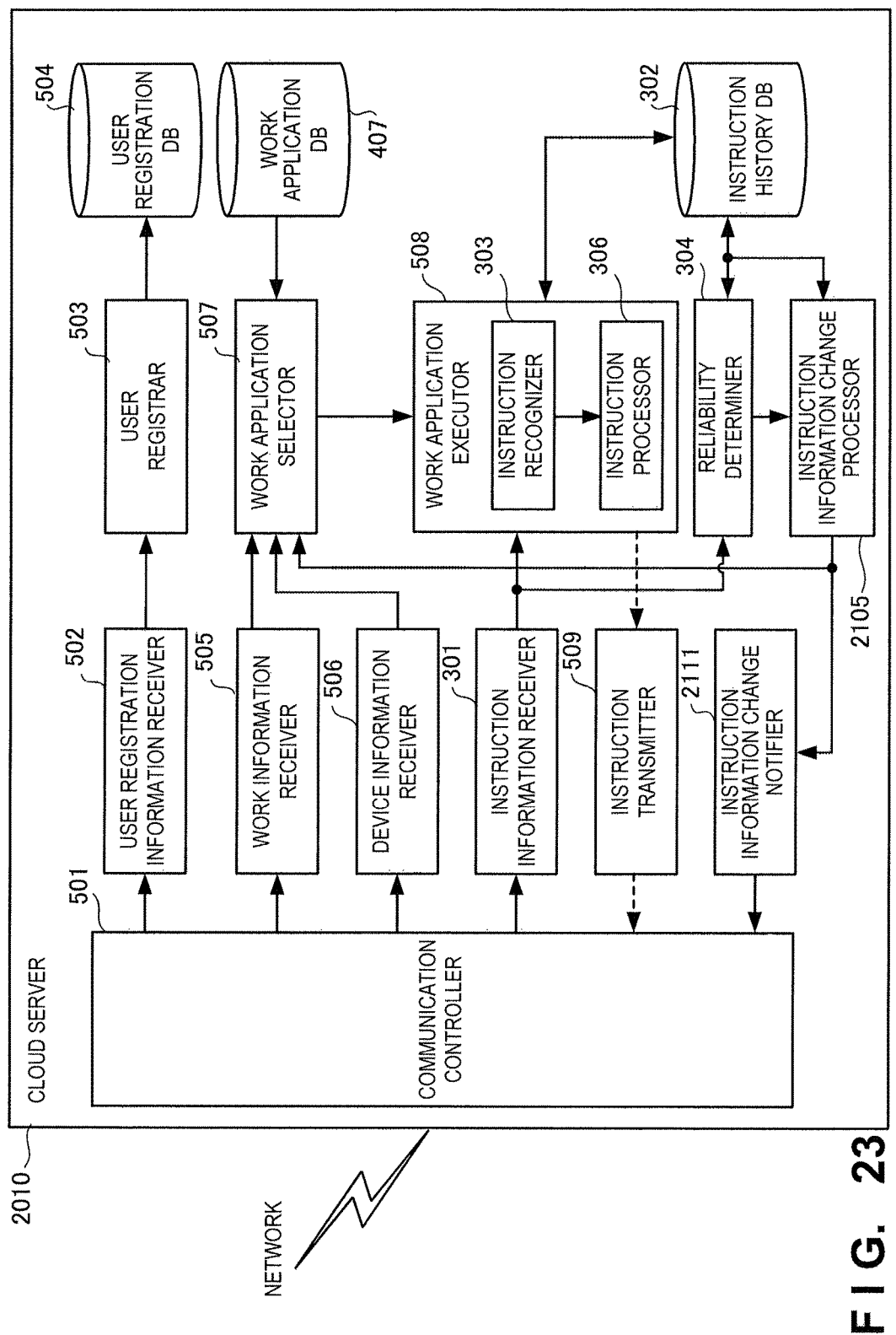
FIG. 23 is a block diagram showing the functional arrangement of the cloud server according to the third embodiment of the present invention.

FIG. 23 is a block diagram showing the functional arrangement of the cloud server 2010 according to this embodiment. Note that the same reference numerals as in FIG. 5 denote the same constituent elements in FIG. 23, and a description thereof will be omitted.

Referring to FIG. 23, if a reliability determiner 304 determines a decrease in the reliability of received instruction information, the instruction information change processor 2105 performs instruction information change processing by referring to an instruction history in an instruction history DB 302 and selecting appropriate instruction information. The instruction information change by the instruction information change processor 2105 is performed under the reception control of an instruction information receiver 301 or a work application executor 508. The instruction information change processor 2105 notifies a work application selector 507 of the instruction information change. The work application selector 507 selects a work application again as needed. Note that in this embodiment, since the device is changed, the device driver to be used is also switched. The instruction information change notifier 2111 notifies the portable terminal 220 of the instruction information change by the instruction information change processor 2105.

(Instruction Information Change Processing)

Figure 24:
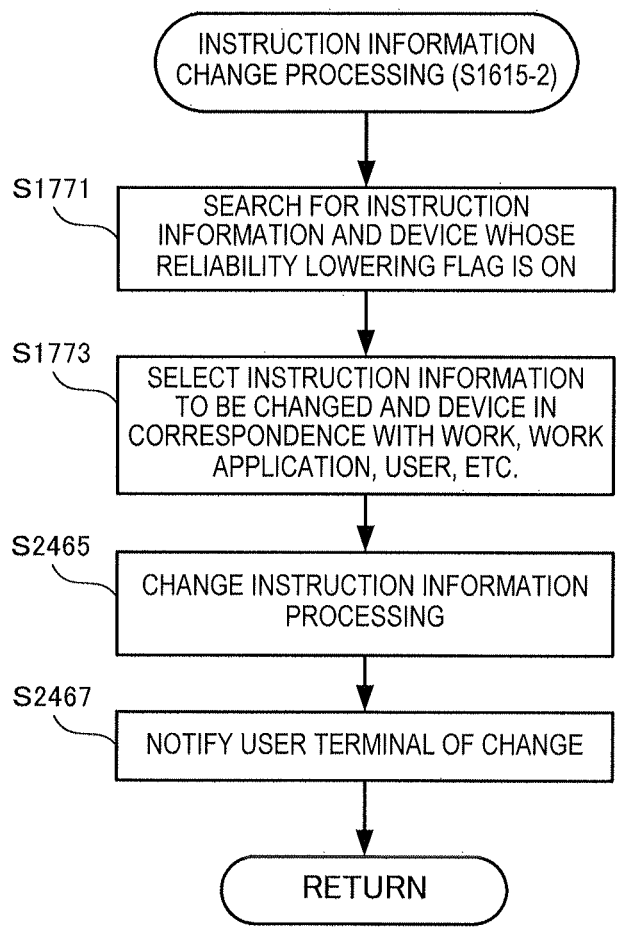
FIG. 24 is a flowchart showing the procedure of instruction information change processing according to the third embodiment of the present invention.

FIG. 24 is a flowchart showing the procedure of instruction information change processing (S1615-2) according to this embodiment. This flowchart replaces step S1615 of FIG. 16 and is executed by a CPU 1110 shown in FIG. 11 using a RAM 1140 to implement the functional components shown in FIG. 23. Note that the same step numbers as in FIG. 17E denote the same steps in FIG. 24, and a description thereof will be omitted.

In step S2465, the CPU 1110 switches instruction information and changes instruction information processing. In step S2475, the CPU 1110 notifies the user terminal that the instruction information is changed.

According to this embodiment, change to a reliable device is automatically done in accordance with a decrease in the reliability of instruction information from a device. It is therefore possible to continue detection of an instruction without an operation of an operator even if the reliability of instruction information detection has lowered.

Fourth Embodiment

A user instruction recognition system including a cloud server that is an information processing apparatus according to the fourth embodiment of the present invention will be described next. The cloud server according to this embodiment is different from the second and third embodiments in that it queries about a connected device necessary to recognize an instruction of a worker at the time of a work in advance before the start of the work at the site. Note that the necessary connected device here means a connected device predicted to be necessary for connection change according to the second embodiment or automatic switching according to the third embodiment by the cloud server that refers to the instruction history DB. The rest of the components and operations is the same as in the second and third embodiments. Hence, the same reference numerals denote the same components and operations, and a detailed description thereof will be omitted.

According to this embodiment, a situation where an appropriate device does not exist or is not connected at the time of device change or automatic switching is avoided in advance. It is therefore possible to quickly and suitably change instruction information.

<<User Instruction Recognition System>>

A user instruction recognition system 2500 including a cloud server 2510 that is an information processing apparatus according to this embodiment will be described with reference to FIGS. 25 and 26.

(Outline of System)

Figure 25:
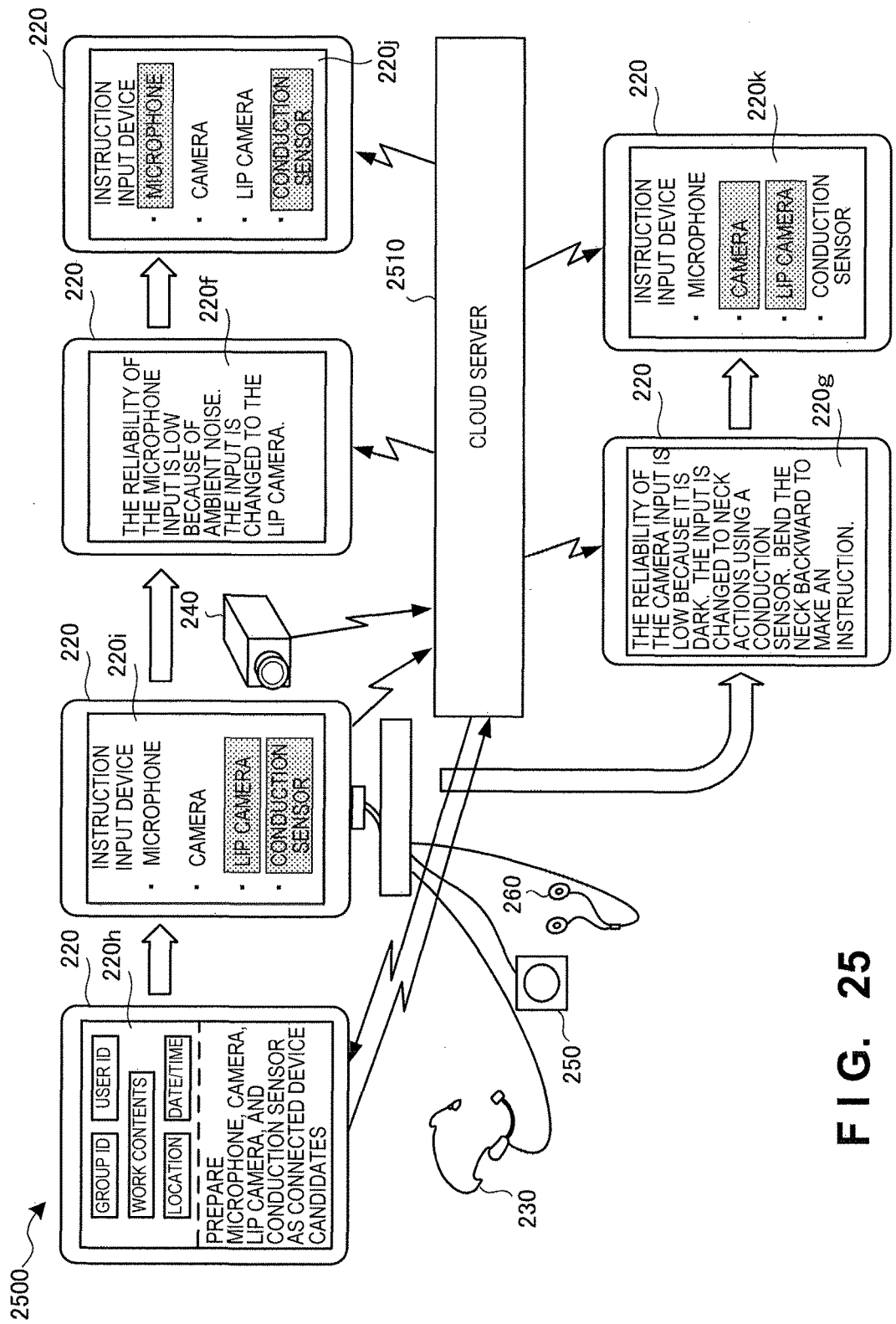
FIG. 25 is a view showing the outline of a user instruction recognition system including a cloud server according to the fourth embodiment of the present invention.

FIG. 25 is a view showing the outline of the user instruction recognition system 2500 including the cloud server 2510 according to this embodiment. Referring to FIG. 25, when a worker who is a user notifies the cloud server 2510 of work information before the start of a work at an outdoor worksite, the cloud server 2510 presents, on a portable terminal 220 that is a smartphone, a list of devices necessary to recognize an instruction of the worker in the work. During the work, the cloud server 2510 recognizes an instruction of the worker based on instruction information acquired from a device prepared and connected to the portable terminal 220. The cloud server 2510 determines the reliability of the instruction information from the device connected to the portable terminal 220, and if the reliability has lowered, switches the device to receive instruction information to a reliable device compatible with instruction information to be combined.

Referring to FIG. 25, the portable terminal 220 notifies the cloud server 2510 of work information, as shown on the upper half of a display screen 220h. In response to this, the cloud server 2510 refers to the instruction history DB and presents a list of devices to be prepared, as shown on the lower half of the display screen 220h of the portable terminal 220. In FIG. 25, a microphone, a camera, a lip camera, and a conduction sensor are presented as connected devices. Note that the connected devices are the same as in FIG. 20 of the third embodiment but need not be the same. In this embodiment, since the devices that can compatibly be combined and are easy to change or switch are prepared, and extra devices are also prepared based on the instruction history in the instruction history DB, selection is done in consideration of the cost. However, the selection is done to avoid any interrupt of a work.

Referring to FIG. 25, an earphone 230 with microphone, a lip camera 250, and a conduction sensor 260 are connected to the portable terminal 220 via a router in accordance with the presentation of the cloud server 2510. A video camera 240 having a communication function detects an action instruction of the worker. A display screen 220i of the portable terminal 220 displays the list of connected devices and also displays, by hatching, that an input speech from the microphone and an input action from the camera are used as the current instruction input of the worker.

If ambient noise increases during a work at a construction site or the like, the cloud server 2510 determines that it is difficult to identify the speech of the worker from microphone input. The cloud server 2510 switches the instruction information detection source to the lip camera 250, receives a lip change from the lip camera 250 and an input action from the video camera 240 as instruction information, refers to the accumulated history of instruction information, and recognizes the instruction of the worker. Note that a display screen 220f of the portable terminal 220 is the same as in FIG. 20. A display screen 220*j* of the portable terminal 220 displays the list of connected devices and also displays, by hatching, that a lip change from the lip camera and an input action from the camera are used as the current instruction input of the worker.

On the other hand, when it grows dark around the worksite in the evening, the cloud server 2510 determines that it is difficult to identify the action of the worker from camera input. The cloud server 2510 switches the instruction information detection source to the conduction sensor 260, receives an electrical signal representing a neck motion from the conduction sensor 260 and an input action from the camera as instruction information, and recognizes the instruction of the worker. Note that a display screen 220*g* of the portable terminal 220 is the same as in FIG. 20. A display screen 220*k* of the portable terminal 220 displays the list of connected devices and also displays, by hatching, that a neck motion from the conduction sensor and an input action from the camera are used as the current instruction input of the worker.

(Operation Procedure of System)

Figure 26:
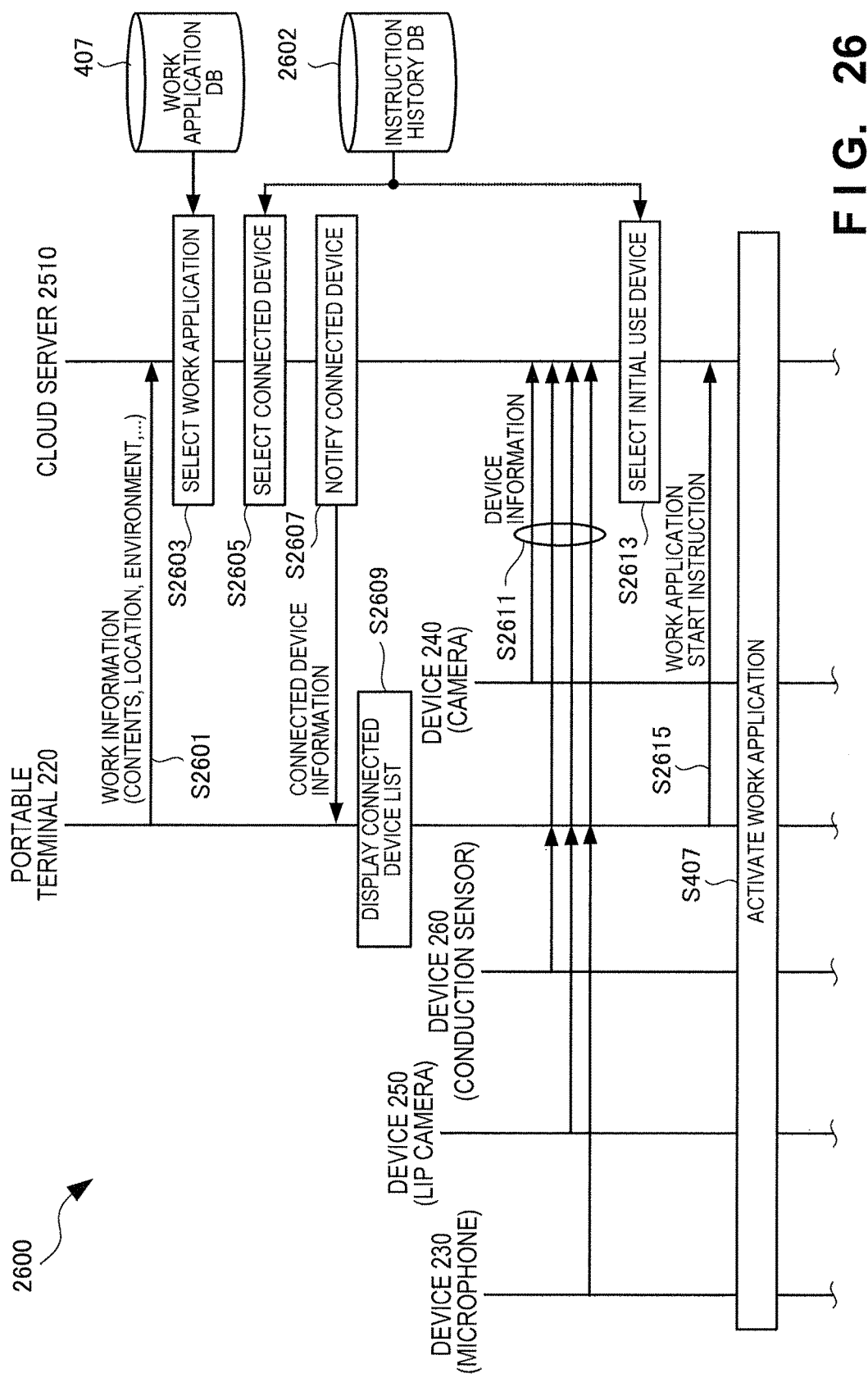
FIG. 26 is a sequence chart showing the operation procedure of the user instruction recognition system including the cloud server according to the fourth embodiment of the present invention.

FIG. 26 is a sequence chart showing an operation procedure 2600 of the user instruction recognition system 2500 including the cloud server 2510 according to this embodiment. Note that the same step numbers as in FIG. 4A denote the same steps in FIG. 26, and a description thereof will be omitted. Although FIG. 26 corresponds to FIG. 4A, FIGS. 22, 4C, and 4D that are other sequence charts are also quoted in this embodiment as well.

In step S2601, the portable terminal 220 of the worker transmits work information including work contents, working location, and working environment to the cloud server 2510. In step S2603, the cloud server 2510 selects, from a work application DB 407, a work application corresponding to the work information received from the portable terminal 220.

In step S2605, the cloud server 2510 refers to the instruction history in an instruction history DB 2602 and selects connected devices to be prepared at the worksite. In step S2607, the cloud server 2510 notifies the portable terminal 220 of the selected connected device information. In step S2609, the portable terminal 220 displays the list of connected device information.

All devices displayed in the list are connected. In step S2611, the cloud server 2510 is notified of device information from each device. In step S2613, the cloud server 2510 refers to the instruction history DB 2602 and selects a device to be initially used to most appropriately detect instruction information of the worker at the worksite. When a work application start instruction is sent from the portable terminal 220 to the cloud server 2510, the work application is activated in step S407.

<<Functional Arrangement of Cloud Server>>

Figure 27:
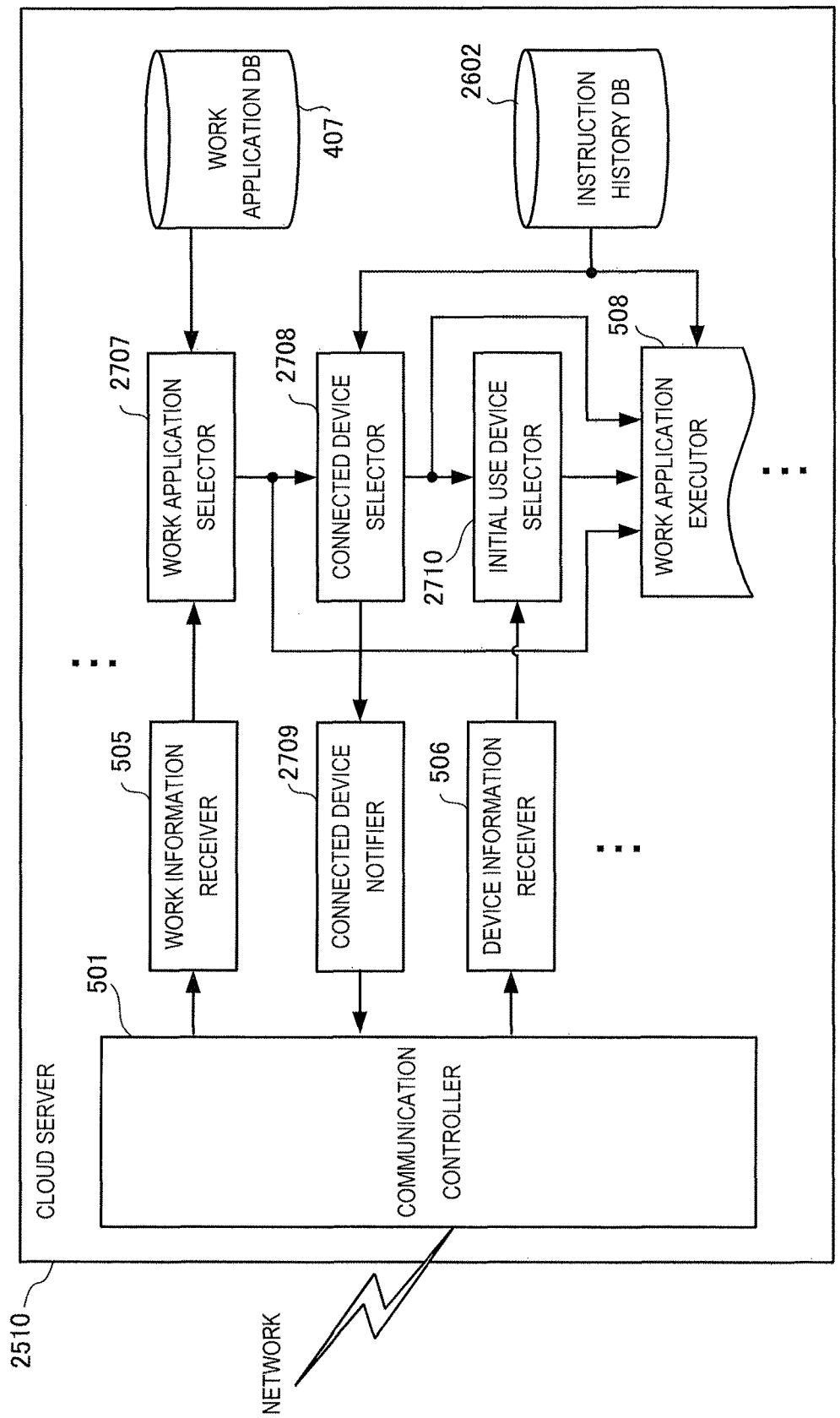
FIG. 27 is a block diagram showing the functional arrangement of the cloud server according to the fourth embodiment of the present invention.

FIG. 27 is a block diagram showing the functional arrangement of the cloud server 2510 according to this embodiment. Note that the same reference numerals particularly as in FIG. 23 denote the same constituent elements in FIG. 27, and a description thereof will be omitted. FIG. 27 shows a portion of this embodiment changed from FIG. 23, and the remaining functional components are omitted.

A work application selector 2707 selects a work application from received instruction information. Based on the selected work application, a connected device selector 2708 refers to the instruction history DB 2602 and selects connected devices to be prepared. A connected device notifier 2709 notifies the portable terminal 220 of the selected connected devices. An initial use device selector 2710 refers to device information that a device information receiver 506 receives from the connected device, selects an initial use device, and notifies a work application executor 508 of it.

(Instruction History DB)

FIG. 28 is a view showing the characteristic arrangement of the instruction history DB 2602 according to this embodiment. The instruction history DB 2602 shows an arrangement of a database added to the instruction history DB 302 shown in FIGS. 9A to 9E. Note that the arrangement of the instruction history DB 2602 is not limited to that shown in FIG. 28.

The instruction history DB 2602 stores different connected device sets 2802 and a success ratio 2803 of each set in association with a work application ID 2801. As the history is accumulated, an appropriate combination is learned by the success ratio. Note that the history may be accumulated by adding other conditions such as a working environment.

(Preparation Device Determination Table)

FIG. 29 is a view showing the arrangement of a preparation device determination table 2900 according to this embodiment. The preparation device determination table 2900 is a table configured to select a connected device in correspondence with work information and a selected work application and is used by the connected device selector 2708 or the initial use device selector 2710.

The preparation device determination table 2900 stores a selected connected device set 2903 in association with work information 2901 and a work application ID 2902.

(Initialization Processing)

Figure 30:
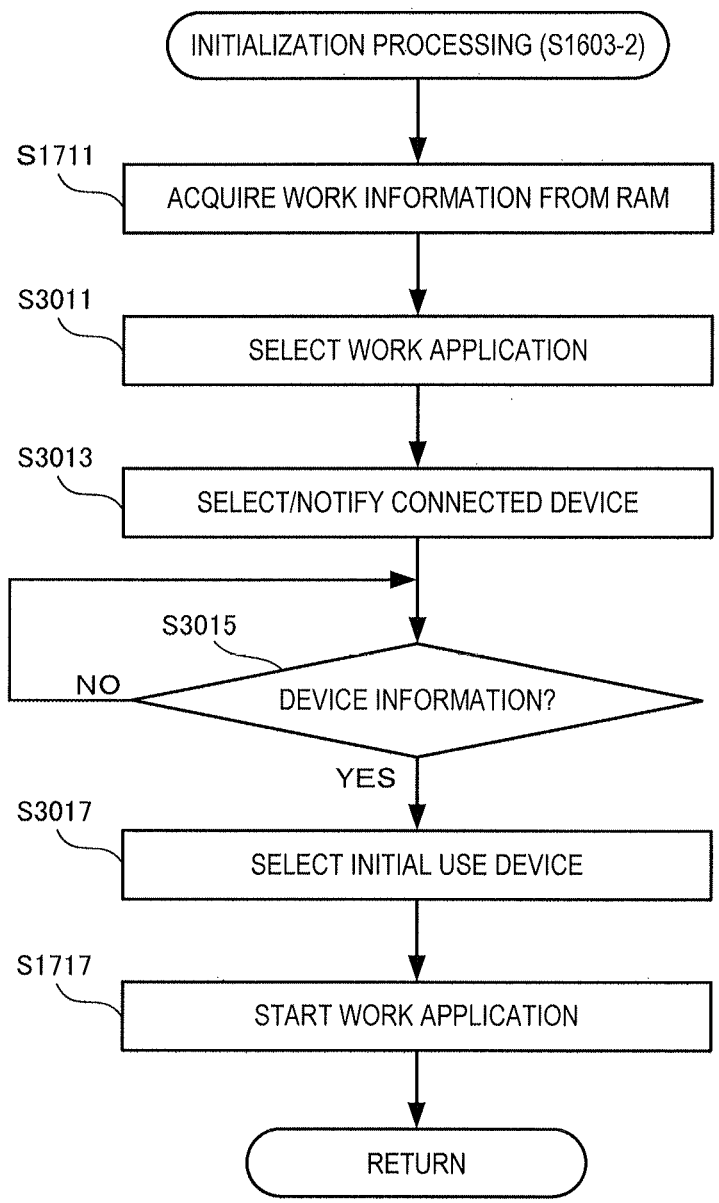
FIG. 30 is a flowchart showing the procedure of initialization processing according to the fourth embodiment of the present invention.

FIG. 30 is a flowchart showing the procedure of initialization processing (S1603-2) according to this embodiment. This flowchart replaces step S1603 of FIG. 16 and is executed by a CPU 1110 shown in FIG. 11 using a RAM 1140 to implement the functional components shown in FIG. 27. Note that the same step numbers as in FIG. 17A denote the same steps in FIG. 30, and a description thereof will be omitted.

In step S3011, the CPU 1110 selects a work application based on work information. In step S3013, the CPU 1110 refers to the instruction history DB 2602 based on the selected work application, selects connected devices, and notifies the portable terminal 220 of them.

In step S3015, the CPU 1110 waits for reception of device information to be transmitted from the devices upon device connection. Upon receiving device information, the CPU 1110 advances to step S3017 to select an initial use device from the connected devices by referring to the instruction history DB 2602.

According to this embodiment, a situation where an appropriate device does not exist or is not connected at the time of device change or automatic switching is avoided in advance. It is therefore possible to quickly and suitably change instruction information.

Fifth Embodiment

A user instruction recognition system including a cloud server that is an information processing apparatus according to the fifth embodiment of the present invention will be described next. The cloud server according to this embodiment is different from the second to fourth embodiments in that it selects more reliably differentiable instruction information from selected devices and presents it to a worker in consideration of a work, worker, working environment, and the like. The rest of the components and operations is the same as in the second to fourth embodiments. Hence, the same reference numerals denote the same components and operations, and a detailed description thereof will be omitted.

That is, for an indoor work or yard operation, an appropriate device is selected, and an instruction pattern with minimum errors for the selected device is also selected. For example, assume that in a recording instruction of crack inspection, a lot of errors occur if an action of nodding forward while making a speech instruction is associated by referring to the history of instruction information. To avoid this, an appropriate combination pattern capable of confirming a user's intention, for example, an action of pointing out a problem for the next operation or bending the neck backward is initially selected and presented. Additionally, if the recognition accuracy of the initially selected instruction pattern lowers during the work, the instruction pattern is changed to another pattern of higher recognition accuracy without changing the device, and the user is instructed to do the change.

According to this embodiment, selection of instruction information is not limited to selection of a device, and more reliably differentiated instruction information is detected by the selected device. It is therefore possible to raise the reliability of instruction information extraction and recognition and reliably recognize an instruction of a worker.

<<User Instruction Recognition System>>

Figure 31:
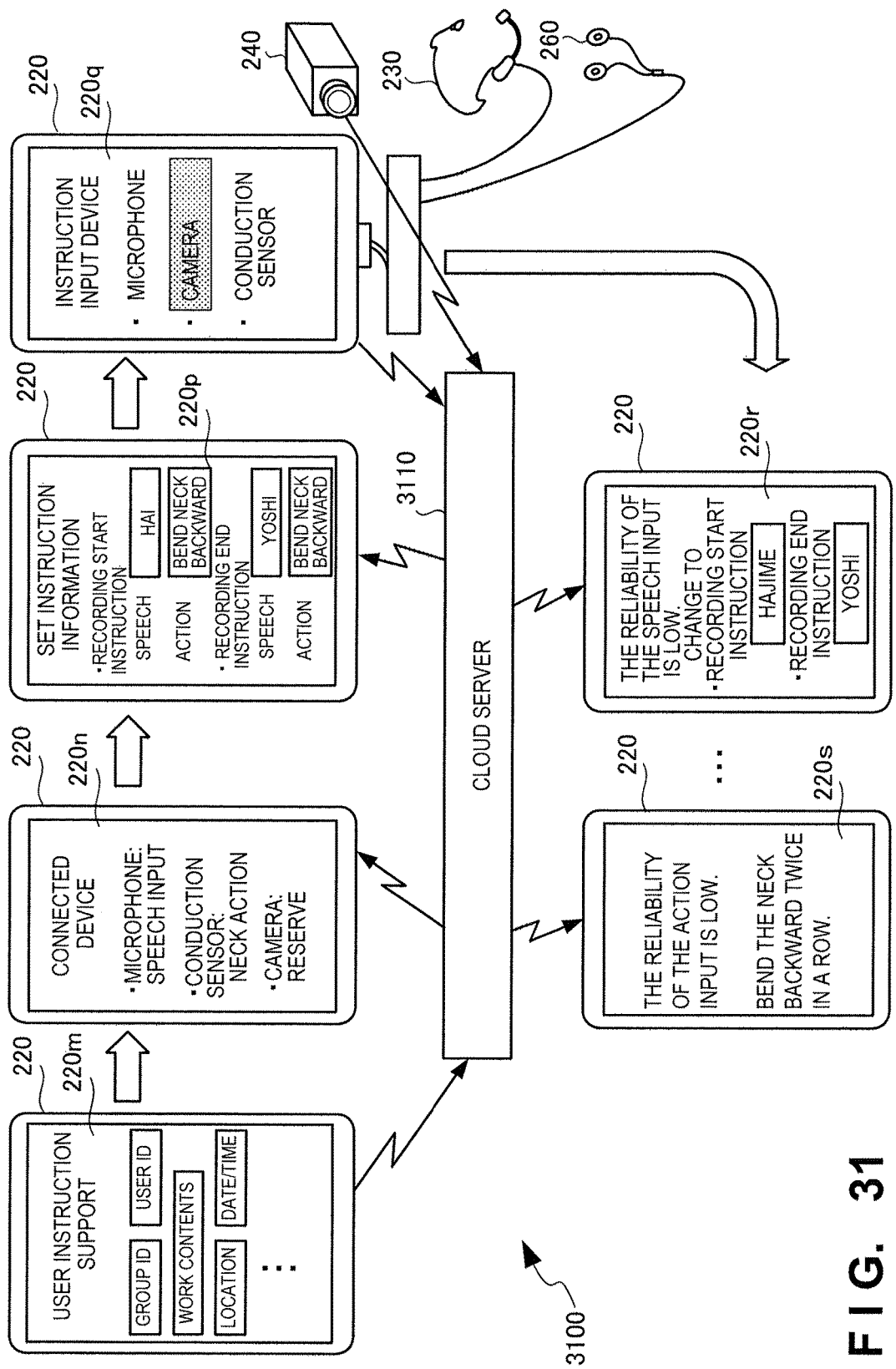
FIG. 31 is a view showing the outline of a user instruction recognition system including a cloud server according to the fifth embodiment of the present invention.

FIG. 31 is a view showing the outline of a user instruction recognition system 3100 including a cloud server 3110 according to this embodiment. For example, when a neck motion is obtained as instruction information using a conduction sensor, the conduction sensor detects a nodding action. However, the human's nodding action probably occurs even without intending to instruct. For this reason, the nodding action without intending to instruct leads to an instruction recognition error. On the other hand, assume that an action of bending the neck backward is detected as an instruction. The action of bending the neck backward is often done intentionally and can therefore be differentiated as an instruction action.

Referring to FIG. 31, the cloud server 3110 selects a device connected to a portable terminal 220 that is a smartphone and instruction information to be acquired, which are used to recognize an instruction of a worker who is a user at an outdoor worksite, by referring to an instruction history DB. The cloud server 3110 determines the reliability of instruction information from the device connected to the portable terminal 220, and if the reliability has lowered, changes the instruction information to be acquired from the device.

Referring to FIG. 31, the user inputs work information from a display screen 220m of the portable terminal 220 to notify the cloud server 3110 of it. The cloud server 3110 selects devices to be connected to recognize an instruction of a worker by referring to the instruction history DB, and presents them on a display screen 220n of the portable terminal 220. The cloud server 3110 also selects instruction information to be acquired from the devices to be connected by referring to the instruction history DB, and presents the information on a display screen 220p of the portable terminal 220. That is, in an information recording instruction when doing necessary recording in an information recording apparatus in a soil survey or the like, the cloud server 3110 initially selects, as a combination of detection information of higher recognition success ratio, to make a recording start instruction by combining a worker's speech "hai" and the action of "bending the neck backward" and make a recording end instruction by combining a worker's speech "yoshi" and the action of "bending the neck backward". A display screen 220q of the portable terminal 220 displays that an input speech from the microphone and a neck action based on action information from the conduction sensor are used as the current instruction input of the worker.

If the reliability of the combination of the speech inputs "hai" and "yoshi" has lowered, the cloud server 3110 refers to the instruction history in the instruction history DB, and changes the speech inputs to "hajime" and "yoshi" as instruction information to be acquired from an earphone 230 with microphone, as indicated by a display screen 220r of the portable terminal 220. Note that the change of the speech input for recording start from "hai" to "hajime" is selected by determining improvement of the reliability of the word of instruction input (use of a word that is not used for other purposes), differentiation of the speech input between the start and the end of recording, and the like by referring to the instruction history DB.

On the other hand, if the reliability of the instruction of the action input "bending the neck backward" lowers, the cloud server 3110 selects an action input "bending the neck backward twice in a row" and designates it as the instruction information of the worker, as indicated by a display screen 220s of the portable terminal 220. The reliability of the instruction of "bending the neck backward" lowers in a case where, for example, the action of "bending the neck backward" frequently occurs due to the habit of the worker. The change to the action input "bending the neck backward twice in a row" is done because making the action twice in row allows the intention of the instruction of the worker to be more clearly grasped.

The determination of the decrease in the reliability of instruction information and the change of instruction information are merely examples. When the instruction history is accumulated, as in this embodiment, similar reliability recovery can be done for various kinds of connected devices as well.

<<Functional Arrangement of Cloud Server>>

Figure 32:
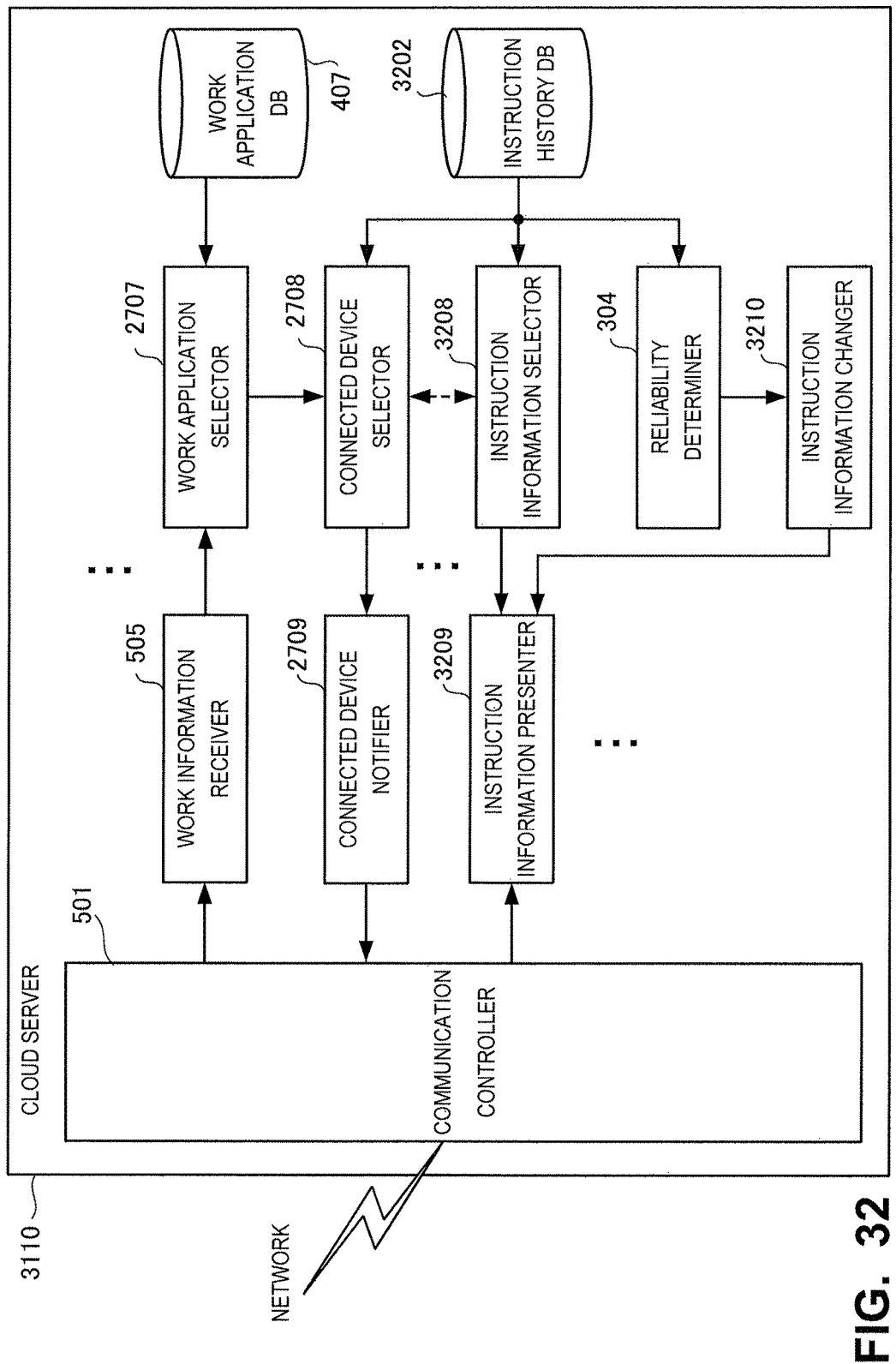
FIG. 32 is a block diagram showing the functional arrangement of the cloud server according to the fifth embodiment of the present invention.

FIG. 32 is a block diagram showing the functional arrangement of the cloud server 3110 according to this embodiment. Note that the same reference numerals particularly as in FIG. 27 denote the same constituent elements in FIG. 32, and a description thereof will be omitted. FIG. 32 shows a portion of this embodiment changed from FIG. 27, and the remaining functional components are omitted.

An instruction information selector 3208 refers to an instruction history DB 3202 and selects differentiable instruction information capable of more reliably acquiring instruction information as a combination with a selected connected device. An instruction information presenter 3209 notifies the portable terminal 220 of the selected instruction information as initial instruction information. However, if a reliability determiner 304 determines a decrease in the reliability of the instruction information, an instruction information changer 3210 changes the instruction information to be acquired without changing the connected device. The instruction information presenter 3209 notifies the portable terminal 220 of the change of the instruction information as well. An appropriate combination of a connected device and instruction information to be acquired is thus learned.

(Instruction History DB)

Figure 33:
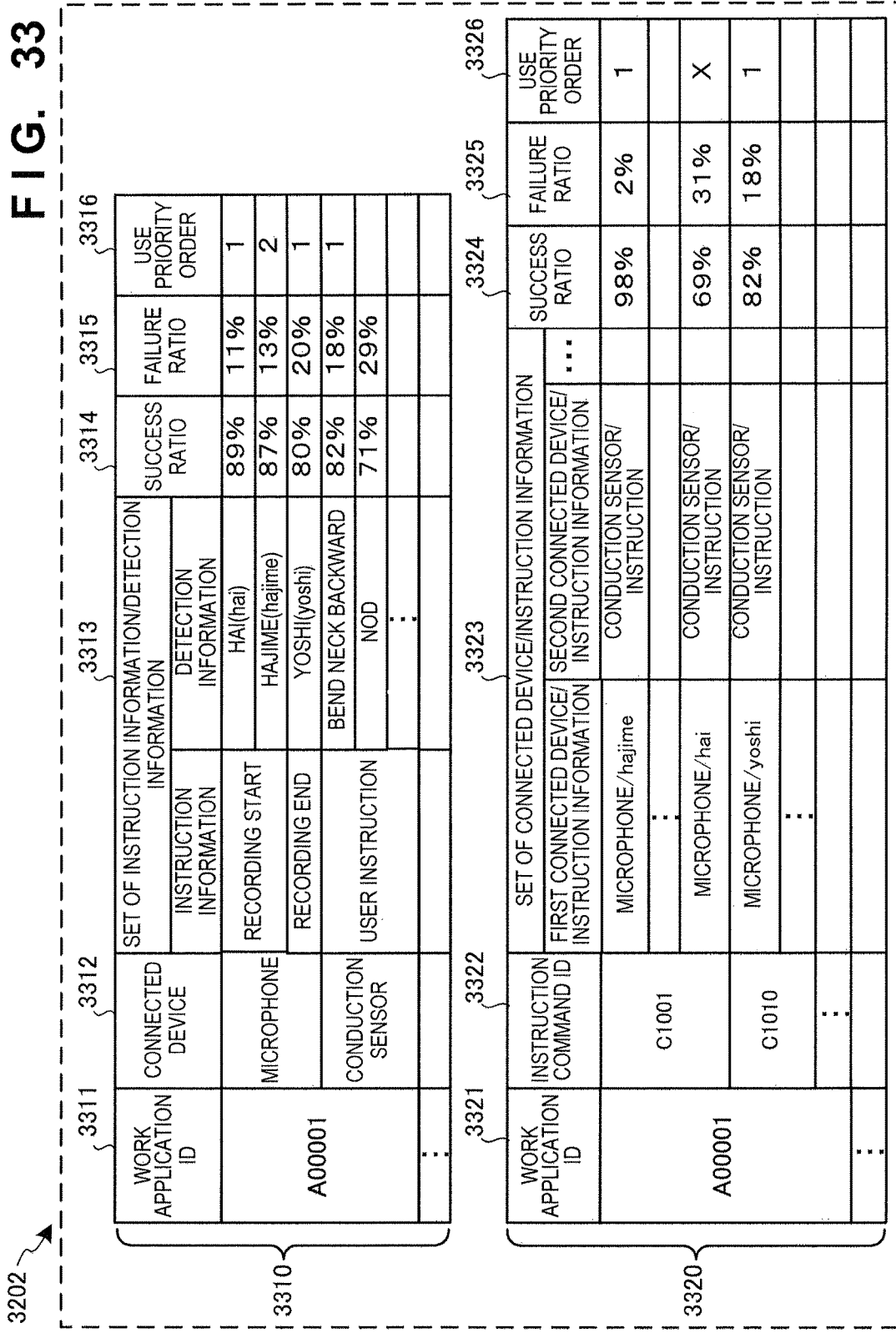
FIG. 33 is a view showing the characteristic arrangement of an instruction history DB according to the fifth embodiment of the present invention.

FIG. 33 is a view showing the characteristic arrangement of the instruction history DB 3202 according to this embodiment. The instruction history DB 3202 shows an arrangement of a database added to the instruction history DB 302 shown in FIGS. 9A to 9E and the instruction history DB 2602 shown in FIG. 28. Note that the arrangement of the instruction history DB 3202 is not limited to that shown in FIG. 33.

The instruction history DB 3202 includes a detection information selection area 3310 configured to select detection information capable of more reliably recognizing instruction information in work contents by a connected device selected based on initial work contents. The instruction history DB 3202 also includes an instruction recognition progress area 3320 configured to store the progress of the recognition ratio of instruction information during the work and change the detection information in case of a decrease in the reliability.

The detection information selection area 3310 of the instruction history DB 3202 stores a set 3313 of instruction information and detection information used to recognize the instruction information in correspondence with a connected device 3312 used for a work application ID 3311. The detection information selection area 3310 stores a success ratio 3314 and a failure ratio 3315 of recognition using the set 3313 of each instruction information and detection information and a use priority order 3316 of the result.

The instruction recognition progress area 3320 of the instruction history DB 3202 stores a set 3323 of different connected devices and instruction information to be acquired in correspondence with a plurality of instruction command IDs 3322 of a work application ID 3321. The instruction recognition progress area 3320 stores a success ratio 3324 and a failure ratio 3325 of recognition using the set 3323 of each connected device and instruction information to be acquired and a use priority order 3326 of the result. In this example, since the reliability of the combination of "hai" and "bending the neck backward" representing a recording start instruction has lowered, the combination is changed to the combination of "hajime" and "bending the neck backward". Note that the cause of the decrease in the reliability of the combination of "hai" and "bending the neck backward" is assumed to be, for example, a decrease in the recognition ratio of "hai" or a decrease in the identification accuracy of "hai" and "yoshi" caused by the habit of the user's utterance, the sensitivity or characteristic of the microphone, or ambient environment.

(Instruction Information Sorting Table)

FIG. 34 is a view showing the arrangement of an instruction information sorting table 3400 according to this embodiment. The instruction information sorting table 3400 is a table configured to select instruction information or change instruction information in case of a decrease in the reliability of instruction information, and is used by the instruction information selector 3208 or the instruction information changer 3210.

The instruction information sorting table 3400 stores a plurality of instruction command IDs 3402 in correspondence with a work application ID 3401. The instruction information sorting table 3400 also stores an initial set 3403 of a connected device and instruction information, which has the success count and failure count of recognition, a first alternative set 3404, . . . , and an nth alternative set 3405 in association with each instruction command ID 3402.

(Initialization Processing)

Figure 35A:
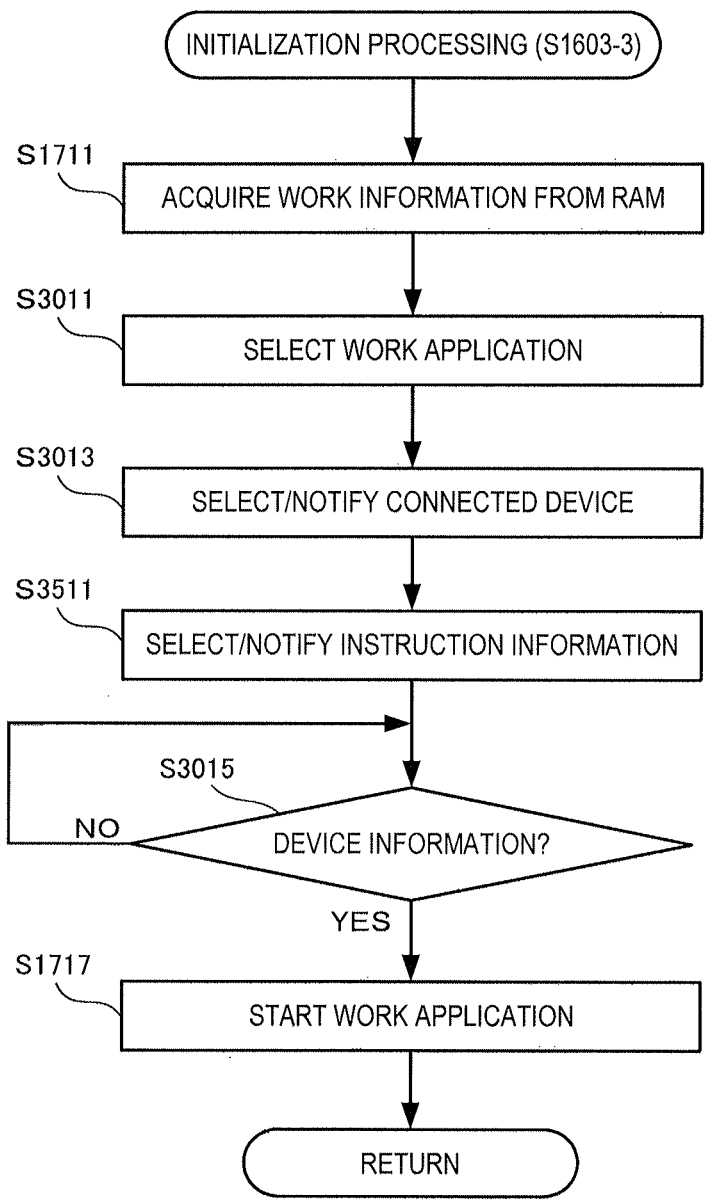
FIG. 35A is a flowchart showing the procedure of initialization processing according to the fifth embodiment of the present invention.

FIG. 35A is a flowchart showing the procedure of initialization processing (S1603-3) according to this embodiment. This flowchart replaces step S1603 of FIG. 16 and is executed by a CPU 1110 shown in FIG. 11 using a RAM 1140 to implement the functional components shown in FIG. 32. Note that the same step numbers as in FIGS. 17A and 30 denote the same steps in FIG. 35A, and a description thereof will be omitted.

In step S3511, the CPU 1110 initially selects instruction information and notifies the portable terminal 220 of it. In this example, to represent a recording start instruction, the CPU 1110 selects the combination of "hai" and "bending the neck backward" and notifies the portable terminal 220 of it. To represent a recording end instruction, the CPU 1110 selects the combination of "yoshi" and "bending the neck backward" and notifies the portable terminal 220 of it. The recognition accuracy in the microphone particularly depends on the speech recognition success ratio. On the other hand, concerning the recognition accuracy in the conduction sensor, the "nodding" action may be done confusingly by the user even in another situation irrespective of the recording instruction and has a poor sorting function. To the contrary, the action of "bending the neck backward" rarely occurs unless the user has the intention to represent the recording instruction. Hence, the action of "bending the neck backward" has an improved function of sorting a user instruction as compared to the nodding action.

(Reliability Determination Processing)

Figure 35B:
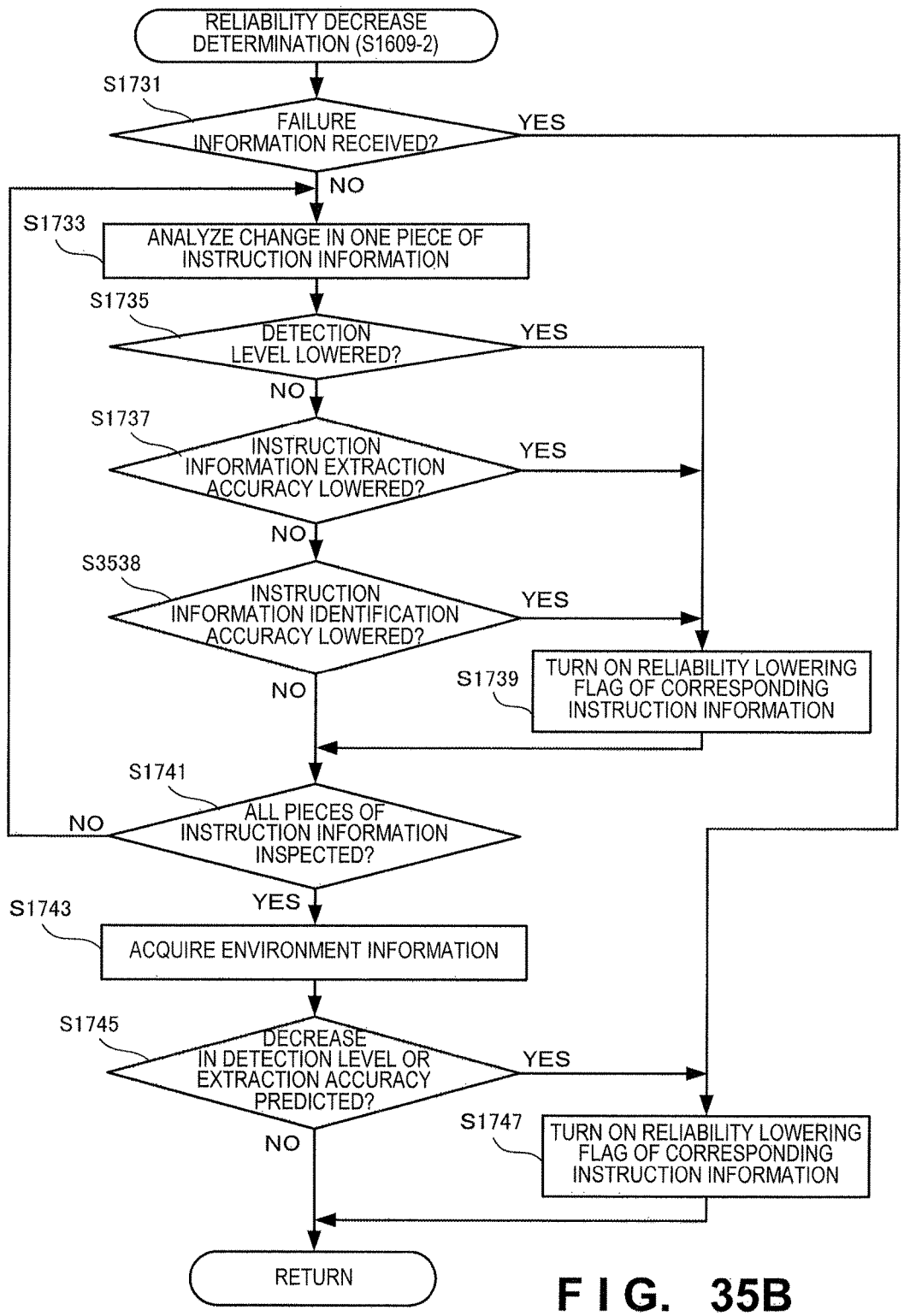
FIG. 35B is a flowchart showing the procedure of reliability determination processing according to the fifth embodiment of the present invention.

FIG. 35B is a flowchart showing the procedure of reliability determination processing (S1609-2) according to this embodiment. This flowchart replaces step S1609 of FIG. 16 and is executed by the CPU 1110 shown in FIG. 11 using the RAM 1140 to implement the functional components shown in FIG. 32. Note that the same step numbers as in FIG. 17C denote the same steps in FIG. 35B, and a description thereof will be omitted.

In step S3538, the CPU 1110 determines a decrease in the identification accuracy of instruction information. Upon determining a decrease in the identification accuracy, the CPU 1110 advances to step S1739 to turn on the reliability decrease flag of corresponding instruction information.

According to this embodiment, selection of instruction information is not limited to selection of a device, and more reliably differentiated instruction information is detected by the selected device. It is therefore possible to raise the reliability of instruction information extraction and recognition and reliably recognize an instruction of a worker.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program.

This application claims the benefit of Japanese Patent Application No. 2012-222560 filed on Oct. 4, 2012, which is hereby incorporated by reference herein in its entirety.

The invention claimed is:

1. An information processing apparatus comprising:
an instruction history accumulator that accumulates a history of at least two different pieces of instruction information respectively detected via at least two different detection devices from a user and a user instruction in association with each other;
an instruction information receiver that receives instruction information;
an instruction recognizer that recognizes the user instruction from the received instruction information by referring to the accumulated history of the at least two different pieces of instruction information and the user instruction;
a reliability determiner that determines a reliability of the received instruction information by referring to the accumulated history of the at least two different pieces of instruction information and the user instruction; and
an instruction information changer that changes the received instruction information to other instruction information by referring to the accumulated history of the at least two different pieces of instruction information and the user instruction, when said reliability determiner determines that the reliability of the received instruction information has lowered.

2. The information processing apparatus according to claim 1, wherein said instruction history accumulator accumulates a history of the at least two different pieces of instruction information and a decrease in a reliability of the at least two different pieces of instruction information in association with each other, and
said reliability determiner determines that the reliability of the received instruction information has lowered when a history of the received instruction information corresponds to the accumulated history of the at least two different pieces of instruction information accumulated in association with the decrease in the reliability.

3. The information processing apparatus according to claim 1, wherein said instruction history accumulator accumulates a history of changing instruction information to other instruction information, and
said instruction information changer selects the other instruction information to be changed based on the accumulated history of the changing.

4. The information processing apparatus according to claim 1, wherein said instruction information changer includes a change instructor that instructs the user to do a change of detection source to the selected other instruction information so as to receive the selected other instruction information.

5. The information processing apparatus according to claim 1, wherein said instruction information changer includes a reception controller that controls said instruction information receiver so as to receive the selected other instruction information, and
said instruction recognizer recognizes the user instruction based on the received other instruction information.

6. The information processing apparatus according to claim 4, wherein said instruction information changer does the change of the detection source to the other instruction information by receiving the instruction information from other detection device.

7. The information processing apparatus according to claim 4, wherein said instruction recognizer comprises:
an instruction information extractor that extracts, from the received instruction information, instruction information detected from the user; and
an instruction content information discriminator that discriminates instruction contents of the extracted instruction information based on the accumulated history of the at least two pieces of instruction information and the user instruction, and
said instruction information changer does the change of detection source to the other instruction information by changing instruction information to be extracted by said instruction information extractor.

8. The information processing apparatus according to claim 1, wherein said instruction history accumulator accumulates environment information when the user detects instruction information and instruction information to be received to recognize the user instruction in association with each other, and
the information processing apparatus further comprises:
an environment information receiver that receives environment information from the user; and
an instruction information presenter that presents, to the user, the instruction information to be received which is accumulated in said instruction history accumulator in association with the received environment information.

9. The information processing apparatus according to claim 1, wherein said instruction information receiver receives, via a portable device, the instruction information detected by the detection device connected to the portable device.

10. The information processing apparatus according to claim 9, wherein said instruction history accumulator accumulates a device driver for the detection device and the detection device in association with each other, and
the information processing apparatus further comprises a driver selector that selects the device driver to be used in correspondence with the detection device connected to the portable device.

11. The information processing apparatus according to claim 1, wherein the at least two pieces of instruction information detected from the user include speech information of the user, video information of the user, and action information of the user, and
the action information of the user includes information detected by a conduction sensor that detects an action of a muscle of the user.

12. The information processing apparatus according to claim 1, wherein the user instruction includes a start instruction and an end instruction of information recording by an information recording apparatus, and
the information processing apparatus further comprises an information recording instructor that instructs the information recording apparatus to do information recording between the start instruction and the end instruction recognized by said instruction recognizer.

13. A user instruction recognition system comprising:
at least two different detection devices that detect at least two different pieces of instruction information;
an instruction history accumulator that accumulates a history of the at least two different pieces of instruction information respectively detected via the at least two different detection devices from a user and a user instruction in association with each other;
an instruction recognizer that recognizes the user instruction from the at least two pieces of instruction information detected by said at least two different detection devices by referring to the accumulated history of the at least two pieces of instruction information and the user instruction;

a reliability determiner that determines a reliability of instruction information by referring to the accumulated history of the at least two pieces of instruction information and the user instruction; and an instruction information changer that changes instruction information to other instruction information by referring to the accumulated history of the at least two pieces of instruction information, when said reliability determiner determines that a reliability of the instruction information has lowered.

14. A user instruction recognition method comprising:

detecting at least two different pieces of instruction information from a user by at least two detection devices;

recognizing a user instruction from the at least two pieces of instruction information detected by the at least two detection devices by referring to a history of the at least two different pieces of instruction information detected from the user and the user instruction accumulated in association with each other;

determining a reliability of detected instruction information by referring to the accumulated history of the at least two pieces of instruction information and the user instruction; and changing the instruction information to other instruction information by referring to the accumulated history of the at least two pieces of instruction information and the user instruction, when it is determined that a reliability of the received instruction information has lowered.

* * * * *